US011923645B2

(12) United States Patent
Bordewyk et al.

(10) Patent No.: US 11,923,645 B2
(45) Date of Patent: Mar. 5, 2024

(54) LOW VOLTAGE POWER RECEPTACLE ASSEMBLY

(71) Applicant: Light Corp Inc., Grand Haven, MI (US)

(72) Inventors: Joshua A. Bordewyk, Grand Haven, MI (US); Nicholas B. Masters, Grand Rapids, MI (US); James A. Kramer, Muskegon, MI (US)

(73) Assignee: Light Corp. Inc., Grand Haven, MI (US)

( * ) Notice: Subject to any disclaimer, the term of this patent is extended or adjusted under 35 U.S.C. 154(b) by 132 days.

(21) Appl. No.: 17/680,371

(22) Filed: Feb. 25, 2022

(65) Prior Publication Data

US 2022/0271484 A1 Aug. 25, 2022

Related U.S. Application Data

(60) Provisional application No. 63/153,674, filed on Feb. 25, 2021.

(51) Int. Cl.
*H01R 27/02* (2006.01)
*H01R 12/70* (2011.01)
*H01R 13/66* (2006.01)

(52) U.S. Cl.
CPC ......... *H01R 27/02* (2013.01); *H01R 12/7023* (2013.01); *H01R 13/665* (2013.01)

(58) Field of Classification Search
CPC ............. H01R 13/6658; H01R 9/2608; H01R 13/665; H01R 27/02; H01R 12/7023
USPC ................................................ 439/532, 76.1
See application file for complete search history.

(56) References Cited

U.S. PATENT DOCUMENTS

| | | | |
|---|---|---|---|
| D256,581 S | 8/1980 | Bartin | |
| 4,667,460 A | 5/1987 | Kramer | |
| D413,571 S | 9/1999 | Glass | |
| 6,004,157 A | 12/1999 | Glass | |
| 6,379,182 B1 | 4/2002 | Byrne | |
| 6,717,053 B2 | 4/2004 | Rupert | |
| 6,971,911 B2 | 12/2005 | Ramsey et al. | |
| D579,873 S | 11/2008 | Gershfeld | |
| 7,540,786 B1 * | 6/2009 | Koser | H01R 13/6658 439/660 |
| 7,663,866 B2 | 2/2010 | Lee | |
| 7,688,564 B2 | 3/2010 | Byrne et al. | |
| D632,258 S | 2/2011 | Sumida | |
| 8,350,406 B2 | 1/2013 | Byrne et al. | |
| 8,444,432 B2 | 5/2013 | Byrne et al. | |

(Continued)

*Primary Examiner* — Gary F Paumen
(74) *Attorney, Agent, or Firm* — Bodman PLC

(57) ABSTRACT

A power receptacle assembly includes a power supply cradle, a circuit subassembly, and a housing. The power supply cradle has a base member and two sidewalls. The base member and sidewalls of the power supply cradle are configured to include one or more protrusions. The circuit subassembly includes a base plate and at least one low voltage power output receptacle electrically connected to the base plate. The base plate is secured to the power supply cradle by the one or more protrusions. With the base plate secured to the power supply cradle, the power supply cradle is arranged within the at least one cavity of the housing, such that base plate of the low voltage power supply circuit subassembly does not directly contact any of the inner surface that forms the at least one cavity of the housing.

17 Claims, 22 Drawing Sheets

(56) References Cited

U.S. PATENT DOCUMENTS

| | | | |
|---|---|---|---|
| 8,480,429 B2 | 7/2013 | Byrne | |
| 8,680,709 B2 | 3/2014 | Byrne et al. | |
| D721,712 S | 1/2015 | Byrne et al. | |
| D740,228 S | 10/2015 | Page et al. | |
| D740,229 S | 10/2015 | Page et al. | |
| 9,288,924 B2 | 3/2016 | Page | |
| 9,312,673 B2 | 4/2016 | Byrne et al. | |
| 9,368,924 B2 | 6/2016 | Byrne et al. | |
| D761,732 S | 7/2016 | Byrne et al. | |
| D762,175 S | 7/2016 | Byrne et al. | |
| 9,392,869 B2 | 7/2016 | Byrne et al. | |
| D788,039 S | 5/2017 | Page et al. | |
| 9,710,025 B2 | 7/2017 | Scott et al. | |
| D798,818 S | 10/2017 | Kondas | |
| D799,428 S | 10/2017 | Kondas | |
| D801,936 S | 11/2017 | Rose | |
| D801,937 S | 11/2017 | Rose | |
| D804,419 S | 12/2017 | Hayes et al. | |
| D812,009 S | 3/2018 | Hayes et al. | |
| D816,037 S | 4/2018 | Byrne et al. | |
| D821,328 S | 6/2018 | Byrne et al. | |
| D827,579 S | 9/2018 | Byrne et al. | |
| D837,160 S | 1/2019 | Byrne et al. | |
| D840,347 S | 2/2019 | Byrne et al. | |
| D848,371 S | 5/2019 | Byrne et al. | |
| D849,686 S | 5/2019 | Byrne et al. | |
| D856,284 S | 8/2019 | Byrne et al. | |
| D856,937 S | 8/2019 | Rupert | |
| D857,633 S | 8/2019 | Byrne et al. | |
| D869,397 S | 12/2019 | Hayes et al. | |
| D874,404 S | 2/2020 | Byrne et al. | |
| D887,363 S | 6/2020 | Byrne et al. | |
| 10,811,809 B2 | 10/2020 | Byrne et al. | |
| D902,862 S | 11/2020 | Rupert | |
| 10,873,167 B2 | 12/2020 | Byrne et al. | |
| 2007/0173082 A1* | 7/2007 | Chiao | H01R 31/06<br>439/76.1 |
| 2012/0258627 A1* | 10/2012 | Huang | H01R 13/6658<br>439/620.21 |
| 2012/0258628 A1* | 10/2012 | Huang | B60R 16/0232<br>439/620.21 |
| 2019/0341712 A1 | 11/2019 | Byrne et al. | |
| 2020/0028342 A1 | 1/2020 | Byrne et al. | |
| 2020/0388971 A1 | 12/2020 | Byrne et al. | |
| 2021/0005989 A1 | 1/2021 | Byrne et al. | |
| 2021/0370785 A1* | 12/2021 | Malandain | G01K 1/16 |

* cited by examiner

LOW VOLTAGE POWER RECEPTACLE ASSEMBLY

CROSS-REFERENCE TO RELATED APPLICATION

This application claims priority under 35 U.S.C § 119(e) to U.S. provisional application Ser. No. 63/153,674, filed Feb. 25, 2021, the disclosure of this prior application is considered part of this application and is hereby incorporated by reference in its entirety.

TECHNICAL FIELD

The disclosure relates generally to power receptacle assemblies, subassemblies, and components thereof.

BACKGROUND

While known power receptacle assemblies, subassemblies, and components thereof have proven to be acceptable for various applications, such power receptacle assemblies, subassemblies, and components thereof are nevertheless susceptible to improvements that may enhance their overall performance and cost. Therefore, a need exists to develop power receptacle assemblies, subassemblies, and components thereof that advance the art.

SUMMARY

One aspect of the disclosure provides a power receptacle assembly that includes a power supply cradle, a circuit subassembly, and a housing. The power supply cradle has a base member, a first sidewall extending from the base member, and a second sidewall extending from the base member. The base member, the first sidewall, and/or the second sidewall of the power supply cradle are configured to include one or more protrusions. The circuit subassembly includes a base plate and at least one low voltage power output receptacle electrically connected to the base plate. The base plate is secured to the power supply cradle by the one or more protrusions. The housing that includes an inner surface that forms at least one elongated cavity. With the base plate secured to the power supply cradle, the power supply cradle is arranged within the at least one cavity of the housing, such that base plate of the low voltage power supply circuit subassembly does not directly contact any of the inner surface that forms the at least one cavity of the housing.

Implementations of the disclosure may include one or more of the following optional features. In some implementations, the one or more protrusions include snap-fit barbs and/or ribs. In some examples, the one or more snap-fit barbs or the one or more ribs may be disposed at or near a proximal end of the power supply cradle. Also or in other examples, the one or more snap-fit barbs or the one or more ribs may be disposed at or near a distal end of the power supply cradle.

Another aspect of the disclosure provides a voltage power supply cradle that includes a base member, a first side member extending from the base member, and a second side member extending from the base member. One or a combination of the base member, the first side member, and the second side member is configured include one or more protrusions that are configured to engage a low voltage power supply circuit board in a secure manner.

A further aspect of the disclosure provides a low voltage power receptacle assembly that includes a power supply cradle that has a base member, a first sidewall extending from the base member, and a second sidewall extending from the base member. One or a combination of the base member, the first sidewall, and the second sidewall is configured to include one or more protrusions. A receptacle circuit subassembly includes a base plate and at least one low voltage power output electrically connected to the base plate and supported thereat. The base plate is secured to the power supply cradle by the one or more protrusions for forming a low voltage receptacle subassembly. A housing includes an inner surface forming at least one cavity. The low voltage receptacle subassembly is arranged within the at least one cavity of the housing, such that base plate of the receptacle circuit subassembly does not directly contact any of the inner surface that forms the at least one cavity of the housing.

The details of one or more implementations of the disclosure are set forth in the accompanying drawings and the description below. Other aspects, features, and advantages will be apparent from the description and drawings, and from the claims.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

BRIEF DESCRIPTION OF THE DRAWINGS

Like reference numerals indicate like parts throughout the drawings.

DETAILED DESCRIPTION

Figure 1:
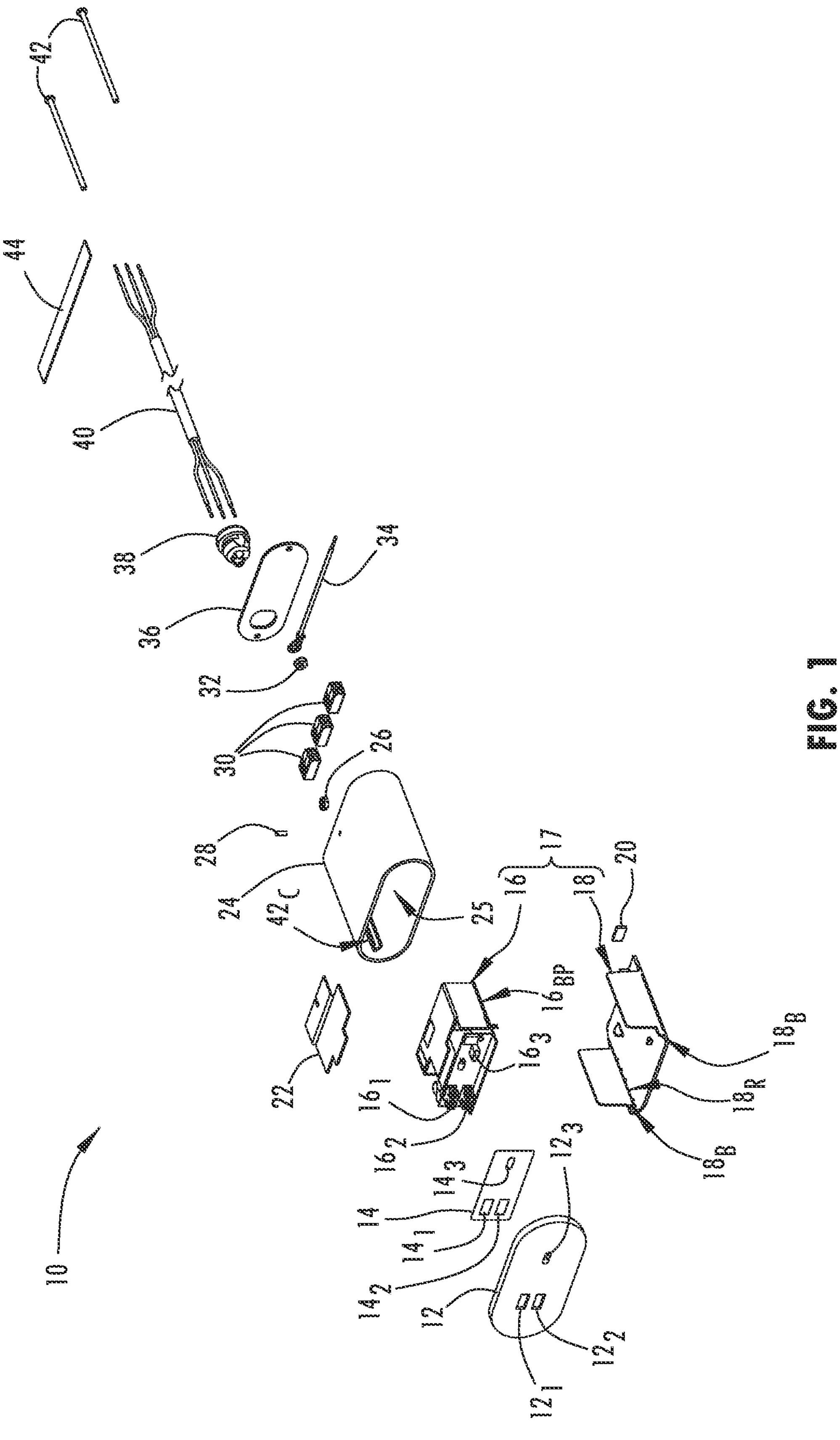
FIG. 1 is an exploded perspective view of an exemplary power receptacle assembly.

The present disclosure relates generally to power receptacle assemblies, subassemblies, and components thereof. Embodiments of the present disclosure provide technical solutions to a number of technical problems in the art.

Exemplary power receptacle assemblies are shown generally at 10 (see, e.g., FIGS. 1-4), 100 (see, e.g., FIGS. 5-8), 200 (see, e.g., FIGS. 9-19), 300 (see, e.g., FIGS. 20-23), 400 (see, e.g., FIGS. 24-27), and 500 (see, e.g., FIGS. 28-31). Except for the power receptacle assembly 500, each power receptacle assembly 10, 100, 200, 300, 400 includes at least one low voltage power supply cradle (see, e.g., 18, 118, 218, 318, 418*a*, 418*b*). Each low voltage power supply cradle of the at least one low voltage power supply cradle 18, 118, 218, 318, 418*a*, 418*b* is configured to retain and support a base plate (see, e.g., 16BP, 116BP, 216BP, 316BP, 416BP) of a low voltage power supply circuit subassembly (see, e.g., 16, 116, 216, 316, 416*a*, 416*b*) for forming at least one low voltage device assembly 17, 117, 217, 317, 417*a*, 417*b*. In some examples, the base plate is a circuit board with embedded electrical contacts that connect to low voltage power output receptacles (see, e.g., 161-163, 1161-1163, 2161, 2162, 3161, 3162, 4161-4164). Furthermore, each power receptacle assembly 10, 100, 200, 300, 400, 500 includes a housing (see, e.g., 24, 124, 224, 324, 424, 524). Each housing 24, 124, 224, 324, 424 of each power receptacle assembly 10, 100, 200, 300, 400 is configured to directly support the at least one low voltage power supply cradle 18, 118, 218, 318, 418*a*, 418*b*, such that the low voltage power supply circuit subassembly 16, 116, 216, 316, 416*a*, 416*b*, 418*a*, 418*b* does not directly contact any portion of an inner surface 24I, 124I, 224I, 324I, 424I, that forms a cavity 25, 125, 225, 325, 425 of the housing 24, 124, 224, 324, 424.

With reference to FIGS. 9-19, the exemplary power receptacle assembly 200 is described. An exemplary low voltage power supply cradle 218 (see, e.g., FIGS. 10A-10C) of the power receptacle assembly 200 and an exemplary low voltage power supply circuit subassembly 216 (see, e.g., FIGS. 11A-11C) of the power supply receptacle assembly 200 cooperate to form an exemplary low voltage device assembly 217 (see, e.g., FIGS. 12A-12H) of the power supply receptacle assembly 200. An exemplary housing 224 (see, e.g., FIG. 13) of the power supply receptacle assembly 200 includes an inner surface 224I that defines an interior cavity 225 that is configured to receive, support, and stow the low voltage device assembly 217 (as seen at FIGS. 14A-14C and 15) of the power supply receptacle assembly 200 (as seen at FIGS. 9 and 16-19).

As will be described in the following disclosure and seen at FIGS. 14C, 15 and 19, the housing 224 is configured to directly support the low voltage power supply cradle 218, such that the low voltage power supply circuit subassembly 216 does not directly contact any surface portion (e.g., the inner surface 224I that defines an interior cavity 225) of the housing 224. The structure and corresponding function or method of use or assembly thereof of the exemplary low voltage power supply cradle 218 (at, e.g., FIGS. 10A-10C), the exemplary low voltage power supply circuit subassembly 216 (at, e.g., FIGS. 11A-11C) that cooperate to form the exemplary low voltage device assembly 217 (at, e.g., FIGS. 12A-12H), and the exemplary housing 224 (at, e.g., FIG. 13) may also be applied to, and, may be substantially similar to the structure and corresponding function or method of use or assembly thereof of any of the at least one low voltage power supply cradles 18, 118, 318, 418*a*, 418*b*, the low voltage power supply circuit subassemblies 16, 116, 316, 416*a*, 416*b*, and the housings 24, 124, 324, 424 as seen at, respectively, FIGS. 1-4, FIGS. 5-8, FIGS. 20-23, and FIGS. 24-27 in the following disclosure.

Figure 9:
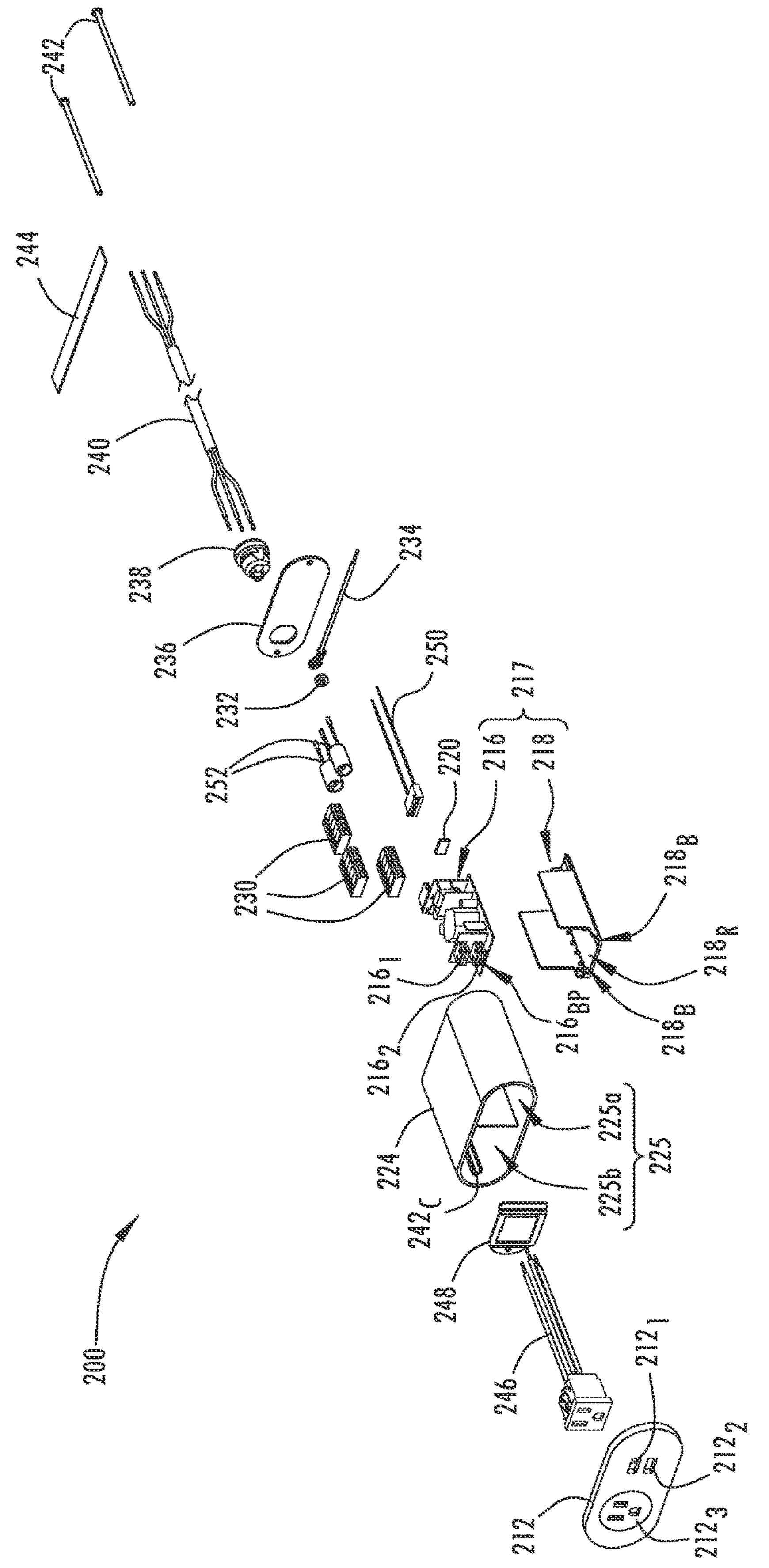
FIG. 9 is an exploded perspective view of an exemplary power receptacle assembly.

With reference to FIG. 9, in some configurations, the power receptacle assembly 200 may include: a faceplate 212; the low voltage power supply circuit subassembly 216; the low voltage power supply cradle 218; a cushion pad 220; the housing 224; a plurality of five port wire splicing connectors 230; a nut 232; a wire jumper 234; a backplate 236; a power cord strain relief port 238; a power cord (including a removal of jacket (ROJ) at a first end and a ROJ or an AC plug at a second end) 240; a plurality of screws 242; a housing label 244; an AC receptacle with wire leads 246; an AC plate enclosure 248; a wire harness 250; and capacitor tube crimps 252.

The faceplate 212 forms a plurality of openings including, for example, a first opening 2121, a second opening 2122, and a third opening 2123. The low voltage power supply circuit subassembly 216 includes a plurality of power output receptacles including, for example, a first power output receptacle 2161 and a second power output receptacle 2162. The power receptacle assembly 200 is similar to the power receptacle assembly 10 of FIG. 1 in that both assemblies 10, 200 include three power outlet receptacles (see, e.g., the three low voltage power outlet receptacles 161, 162, 163 of the power receptacle assembly 10); however, one of the three power outlets of the power receptacle assembly 200 is not a low voltage power outlet receptacle, but, rather, is an AC receptacle with wire leads 246. Furthermore, as seen at FIG. 9, the AC receptacle with wire leads 246 is separately formed from the low voltage power supply circuit subassembly 216 and may receive power from the power cord 240.

Figure 16:
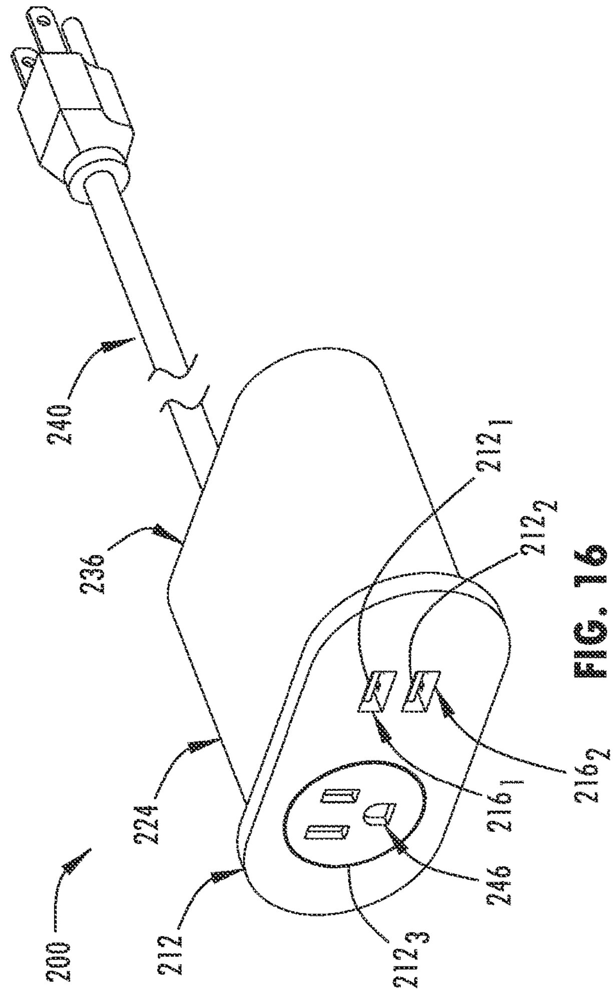
FIG. 16 is an assembled perspective view of the power receptacle assembly of FIG. 9.
Figure 17:
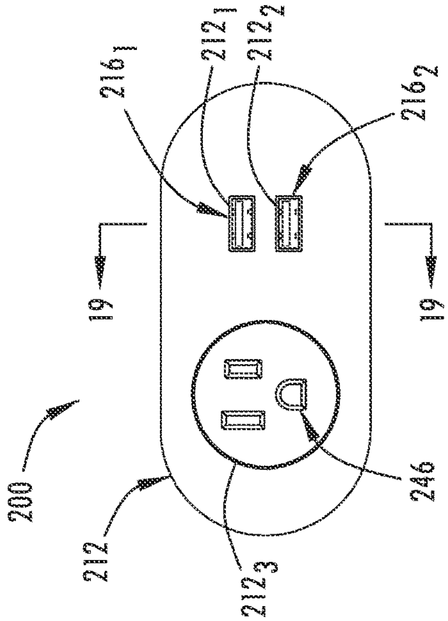
FIG. 17 is a front view of the power receptacle assembly of FIG. 9.
Figure 18:
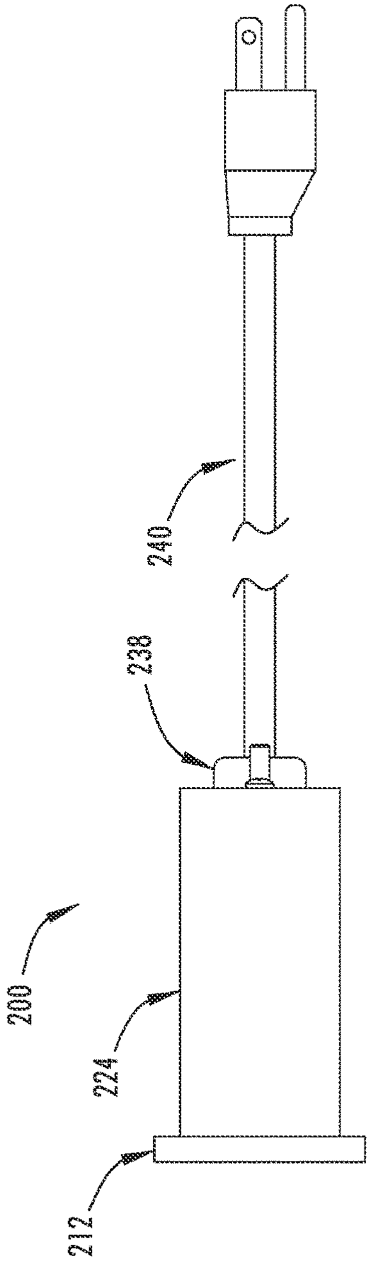
FIG. 18 is a side view of the power receptacle assembly of FIG. 9.
Figure 19:
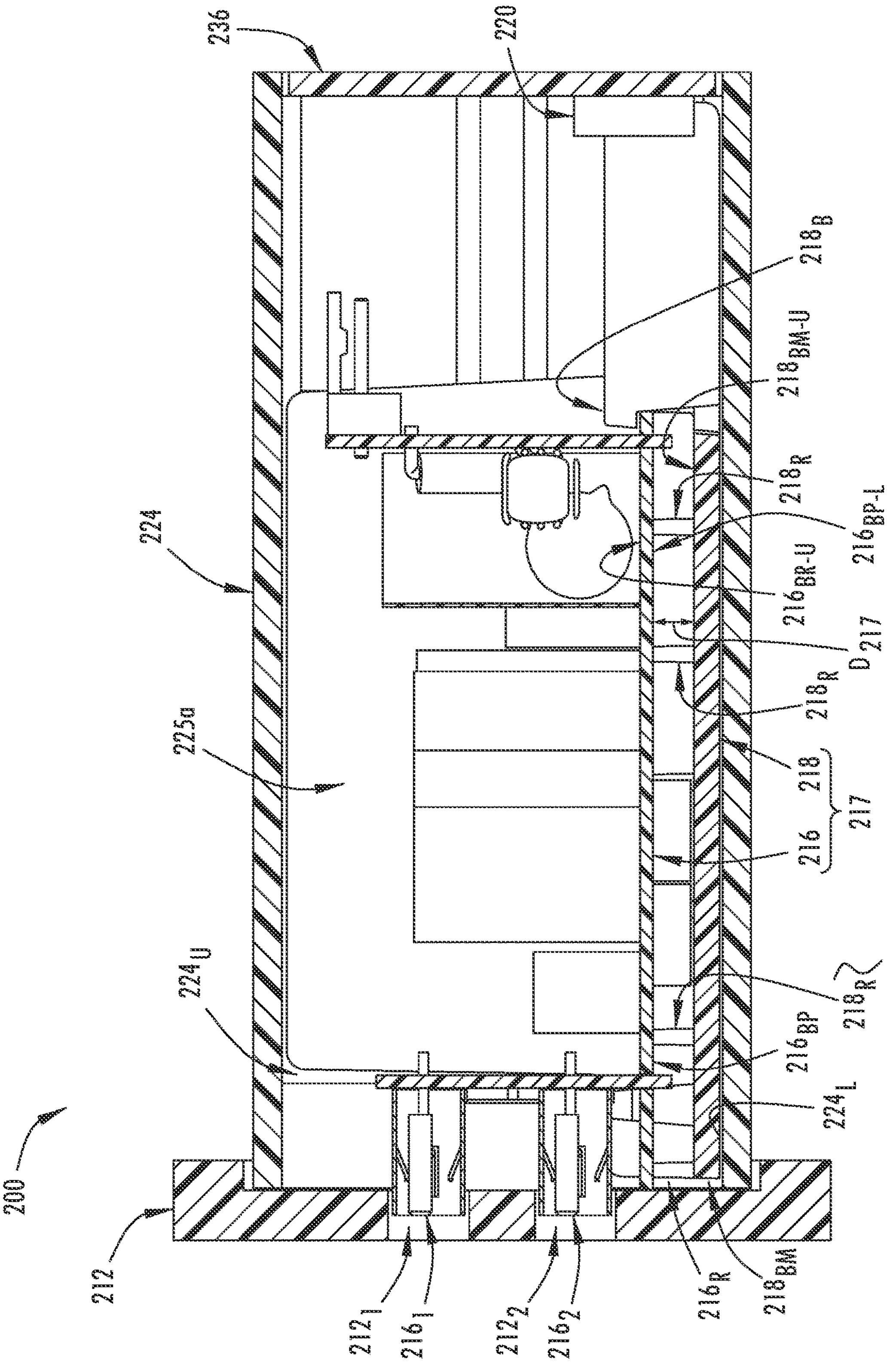
FIG. 19 is a cross-sectional view according to line 19-19 of FIG. 17.

With reference to FIGS. 16-19, when the power receptacle assembly 200 is assembled, the faceplate 212 is sized such that the first opening 2121 and the second opening 2122 reveal one or more portions of, for example, the low voltage power supply circuit subassembly 216 that is contained within and enclosed by the housing 224. As seen at FIG. 19, the one or more revealed portions of the low voltage power supply circuit subassembly 216 may include, for example: the first power output receptacle 2161 (that is aligned with the first opening 2121); and the second power output receptacle 2162 (that is aligned with the second opening 2122). Because, as seen at FIGS. 9 and 16-17, the third power receptacle defined by the AC receptacle with wire leads 246 is separately formed from the low voltage power supply circuit subassembly 216, the third opening 2123 of the faceplate 212 reveals the AC receptacle with wire leads 246 that is contained within and enclosed by the housing 224.

One or more of the first and second power output receptacles 2161, 2162 may be low voltage power output receptacles. In some configurations, the low voltage power output receptacles 2161, 2162 may include, for example: one or more universal serial bus (USB) ports (see, e.g., the first low voltage power output receptacle 2161 and the second low voltage power output receptacle 2162); one or more micro-USB ports (not shown) or the like. Furthermore, the AC receptacle with wire leads 246 may be an AC line voltage power output receptacle that receives power from the power cord 240. Accordingly, the power output receptacles 2161, 2162 and the AC receptacle with wire leads 246 may be sized to receive a correspondingly-sized plug or interface for the purpose of providing, for example, one or both of power and data to, for example, example, one or more: mobile phones; smartwatches; computers; computing devices; tablet computers; headphones; speakers; personal digital assistants; digital cameras; communications equipment; and the like.

The power receptacle assembly 200 that includes the low voltage power supply circuit subassembly 216 and the AC receptacle with wire leads 246 may be sized to allow for compact design that is configured for placement in various locations in which packaging space is limited in, for example, an area where a plurality of power receptacles (e.g., the power output receptacles 2161, 2162, 246) are desired. The low voltage power supply circuit subassembly 216 of the power receptacle assembly 200 may include a power transformer for reducing a line voltage (e.g., 110V AC or 220V AC) that supplies electrical power to standard receptacle outlets, down to a lower voltage (such as, e.g., about 2V DC to about 20V DC), which is made available to users at the power output receptacles 2161, 2162. Accordingly, the power receptacle assembly 200 converts or transforms standard line voltage to a lower voltage power output for use by low voltage power consumers (e.g., one or more: mobile phones; smartwatches; computers; computing devices; tablet computers; headphones; speakers; personal digital assistants; digital cameras; communications equipment; and the like). Accordingly, the low voltage power supply circuit subassembly 216 converts or transforms a line voltage input received from the power cord 240 to the low voltage power output receptacles 2161, 2162.

As seen at, for example, FIG. 19, the low voltage power supply circuit subassembly 216 and other components (seen at, e.g., reference numerals 218-220, 230-234, 246-252 at FIG. 9) may be connected to one another contained within the housing 224. The faceplate 212 may be secured to a front end or proximal end of the housing 224 (e.g., in a friction-fit or adhesive connection), and the backplate 236 may be secured to a rear end or distal end of the housing 224 by the plurality of screws 242.

Figure 13:
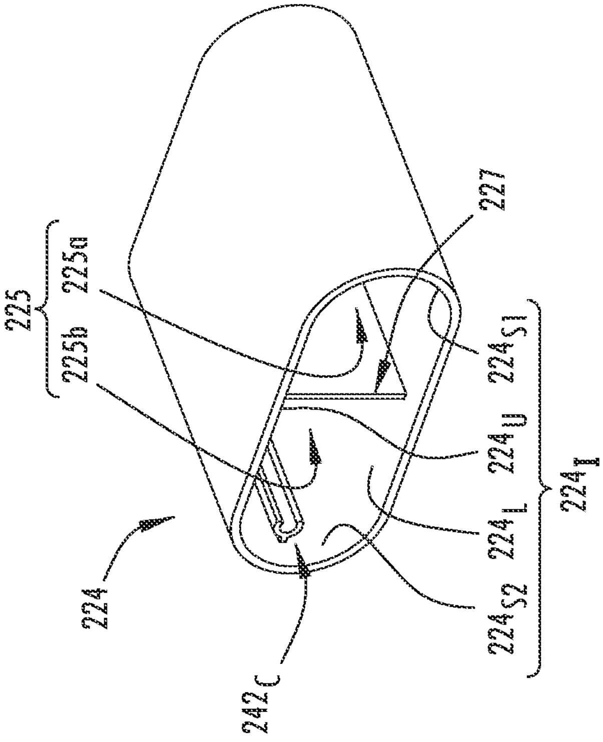
FIG. 13 is a perspective view of a housing of the power receptacle assembly of FIG. 9.

Referring to FIG. 13, the housing 224 may include an inner surface 224I that defines an interior cavity 225 of the housing 224. Furthermore, the housing 224 may include an interior wall 227 that subdivides the interior cavity 225 into a first sub-cavity 225*a* that is sized for containing the low voltage device assembly 217 (as seen at, e.g., FIGS. 14A-14C and 15) and a second sub-cavity 225*b* that is sized for containing the AC receptacle with wire leads 246 (as seen at, e.g., FIG. 9).

Figure 14A:
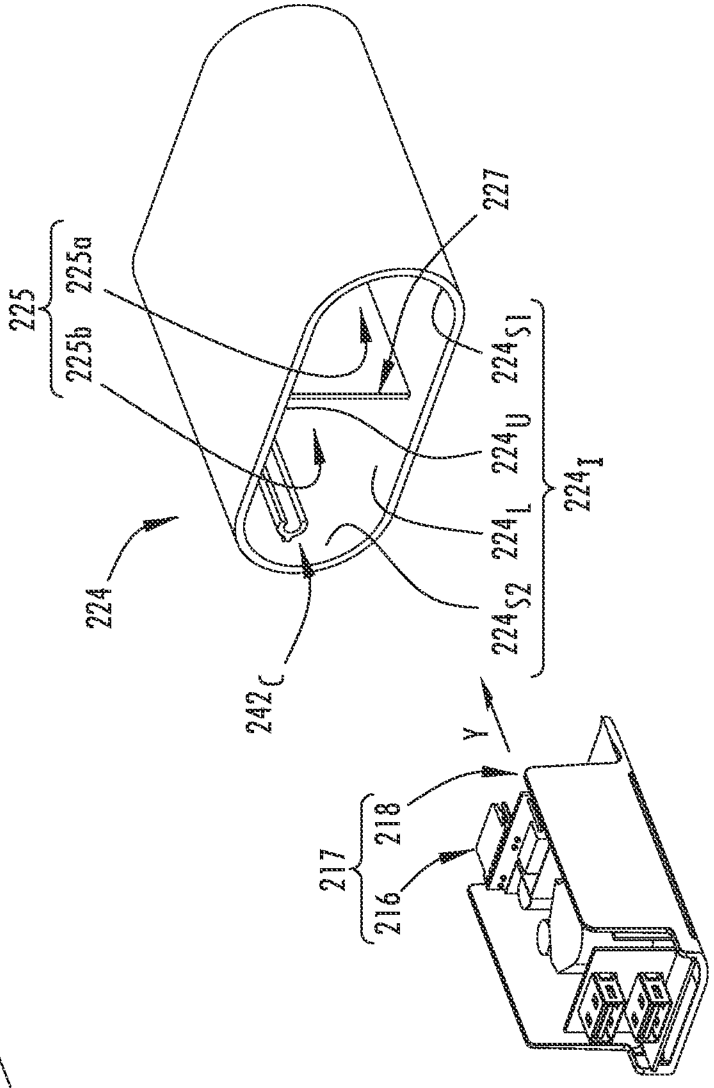
FIG. 14A is an exploded perspective view of a subassembly of the power receptacle assembly of FIG. 9 that includes the low voltage device assembly of FIG. 12B and the housing of FIG. 13.

The inner surface 224I of the housing 224 may be formed by, for example, a lower inner surface 224L, an upper inner surface 224U, a first inner side surface 224S1, and a second inner side surface 224S2. Each of the first inner side surface 224S1 and the second inner side surface 224S2 may include, for example, one or more screw-receiving channels 242C that are sized for receiving the plurality of screws 242 for the purpose of removably-securing the backplate 236 to the rear end of the housing 224. The remaining surface portions defining the inner surface 224I of the housing 224 do not include surface interruptions such as, for example, longitudinal or elongate: slots; grooves; channels; protrusions; or the like that may be otherwise sized for slidably-receiving (in, for example, a direction according to an arrow Y as seen at FIG. 14A), for example, any portion of the low voltage power supply circuit subassembly 216 such as, for example, a base plate (see, e.g., base plate 216BP at, for example, FIGS. 911A-11C, 12A-12H, 15, and 19) of the low voltage power supply circuit subassembly 216 within, for example, the first sub-cavity 225*a*.

Figure 10C:
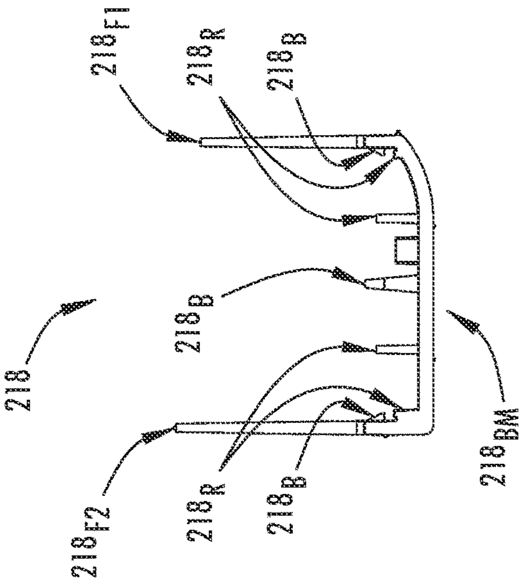
FIG. 10C is a front view of the low voltage power supply cradle of FIG. 10A.
Figure 10A:
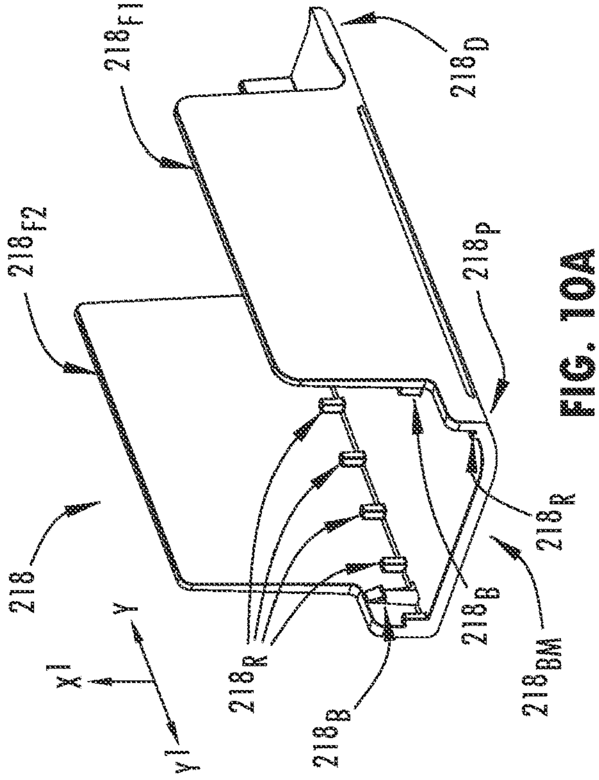
FIG. 10A is a perspective view of an exemplary low voltage power supply cradle of the power receptacle assembly of FIG. 9.
Figure 10B:
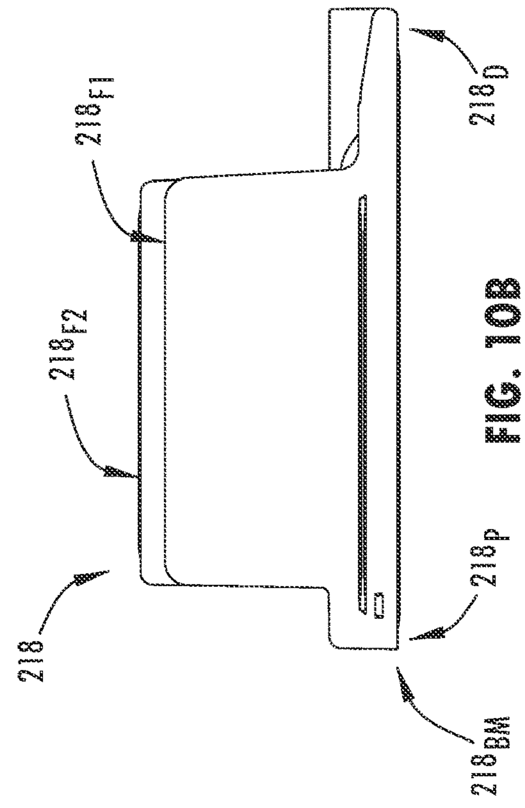
FIG. 10B is a side view of the low voltage power supply cradle of FIG. 10A.

With reference to FIGS. 10A-10C, in some configurations, the low voltage power supply cradle 218 includes a base member 218BM, a first sidewall 218F1 extending from the base member 218BM, and a second sidewall 218F2 extending from the base member 218BM. Collectively, the base member 218BM, the first sidewall 218F1, and the second sidewall 218F2 may form a substantially U-shaped body, which is seen at, for example, a front view of the low voltage power supply cradle 218 at FIG. 10C. As further show in FIG. 10C, the first and second sidewalls 218F1, 218F2 extend vertically upward in the X' direction (FIG. 10A) from lateral edges of in the base member 218BM and taper in thickness as they extend to upper edges of the first and second sidewalls 218F1, 218F2, which are configured to contact the an upper inner surface 224U of the housing 224 when disposed therein.

With continued reference to FIGS. 10A-10C and 12E, one or a combination of the base member 218BM, the first sidewall 218F1, and the second sidewall 218F2 may be configured include one or more protrusions (see, e.g., one or more snap-fit barbs 218B and one or more ribs 218R); the one or more protrusions 218B, 218R may, in some configurations, not be elongate (i.e., the one or more protrusions 218B, 218R do not extend along a length of the low voltage power supply cradle 218 between approximately, for example, a proximal end 218P of the low voltage power supply cradle 218 and a distal end 218D of the low voltage power supply cradle 218). Functionally, the one or more snap-fit barbs 218B, and one or more ribs 218R retain and support the base plate 216BP of the low voltage power supply circuit subassembly 216 to/upon the low voltage power supply cradle 218.

In some configurations, the low voltage power supply cradle 218 may include a plurality of snap-fit barbs 218B, such as, for example, at least three snap-fit barbs 218B. In some examples, a first snap-fit barb 218B and a second snap-fit barb 218B may extend from the proximal end 218P of the low voltage power supply cradle 218. In other examples, a third snap-fit barb 218B may extend from the distal end 218D of the low voltage power supply cradle 218.

With reference to FIGS. 10A and 10C, the first snap-fit barb 218B may extend from one or both of the base member 218BM and the first sidewall 218F1 near the proximal end 218P of the low voltage power supply cradle 218. With reference to FIGS. 10A and 10C, the second snap-fit barb 218B may extend from one or both of the base member 218BM and the second sidewall 218F2 near the proximal end 218P of the low voltage power supply cradle 218. As seen at FIGS. 10C and 12E, the third snap-fit barb 218B may extend from the base member 218BM and be arranged approximately between the first sidewall 218F1 and the second sidewall 218F2 near the distal end 218D of the low voltage power supply cradle 218.

With reference to FIG. 10A, directionally, after the low voltage power supply circuit subassembly 216 is secured to the low voltage power supply cradle 218 (see, e.g., FIG. 12B), the plurality of snap-fit barbs 218B may prevent the low voltage power supply circuit subassembly 216 from moving: (1) in an axial direction according to the directional arrow X' at FIG. 10A as a result of the inclusion of one or more of the plurality of snap-fit barbs 218B; and (2) in an axial direction according to the directional arrow Y at FIG. 10A as a result of the inclusion of the third snap-fit barb 218B that may be arranged approximately between the first sidewall 218F1 and the second sidewall 218F2 near the distal end 218D of the low voltage power supply cradle 218, which is seen generally at FIG. 19. With continued reference to FIG. 10A, if, for example, the low voltage power supply circuit subassembly 216 may need to be, for example, inspected or serviced, after removing the faceplate 212 from the housing 224, because the low voltage power supply cradle 218 does not include a snap-fit bard that may be arranged directly opposite the third snap-fit barb 218B (e.g., at the proximal end 218P of the low voltage power supply cradle 218 approximately between the first sidewall 218F1 and the second sidewall 218F2 near the distal end 218D of the low voltage power supply cradle 218), the low voltage power supply circuit subassembly 216 may be permitted to be removed from the low voltage power supply cradle 218 according to the direction of the directional arrow Y' at FIG. 10A.

Referring to FIGS. 10A and 10C, in some implementations, the low voltage power supply cradle 218 may include a plurality of ribs 218R. In some examples, the plurality of ribs 218R may extend from one or both of the base member 218BM and the first sidewall 218F1. In other examples, the plurality of ribs 218R may extend from one or both of the base member 218BM and the second sidewall 218F2. In yet other configurations, the plurality of ribs 218R may extend from the base member 218BM and be arranged approximately between the first sidewall 218F1 and the second sidewall 218F2.

Figure 11C:
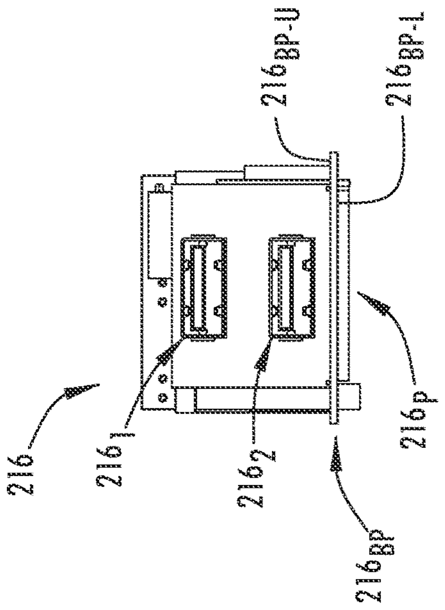
FIG. 11C is a front view of the low voltage power supply circuit subassembly of FIG. 11A.
Figure 11A:
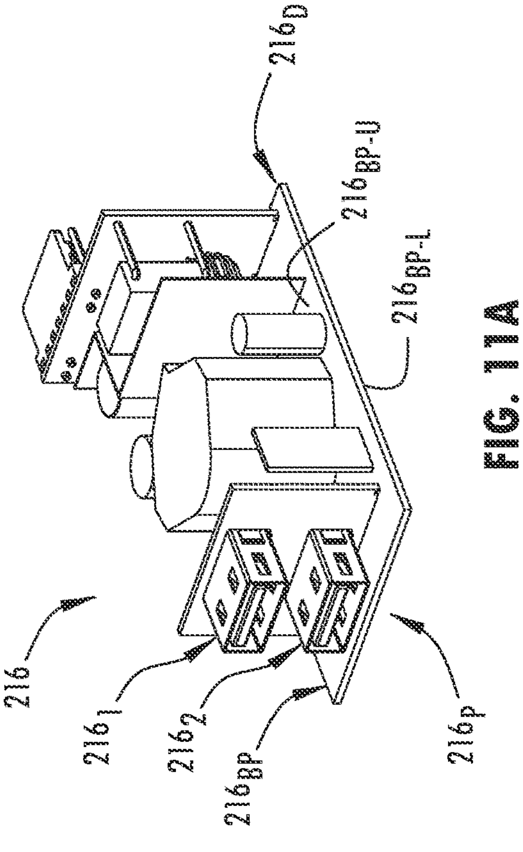
FIG. 11A is a perspective view of an exemplary low voltage power supply circuit subassembly of the power receptacle assembly of FIG. 9.
Figure 11B:
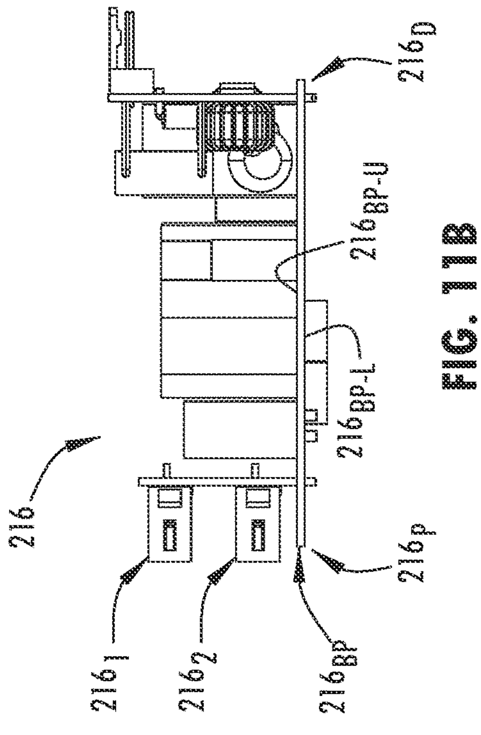
FIG. 11B is a side view of the low voltage power supply circuit subassembly of FIG. 11A.

Referring to FIGS. 11A-11C, an exemplary configuration of the low voltage power supply circuit subassembly 216 is shown. A plurality of circuitry components including, for example, the first low voltage power output receptacle 2161 and the second low voltage power output receptacle 2162 may extend from, be supported by, and are electrically connected to the base plate 216BP. The base plate 216BP may include an upper surface 216BP-U and a lower surface 216BP-L.

In some configurations, the first low voltage power output receptacle 2161 and the second low voltage power output receptacle 2162 may be arranged near a proximal end 216P of the low voltage power supply circuit subassembly 216. As seen at FIGS. 11A and 11B, the low voltage power supply circuit subassembly 216 may also include a distal end 216D arranged opposite the proximal end 216P of the low voltage power supply circuit subassembly 216.

Figure 12B:
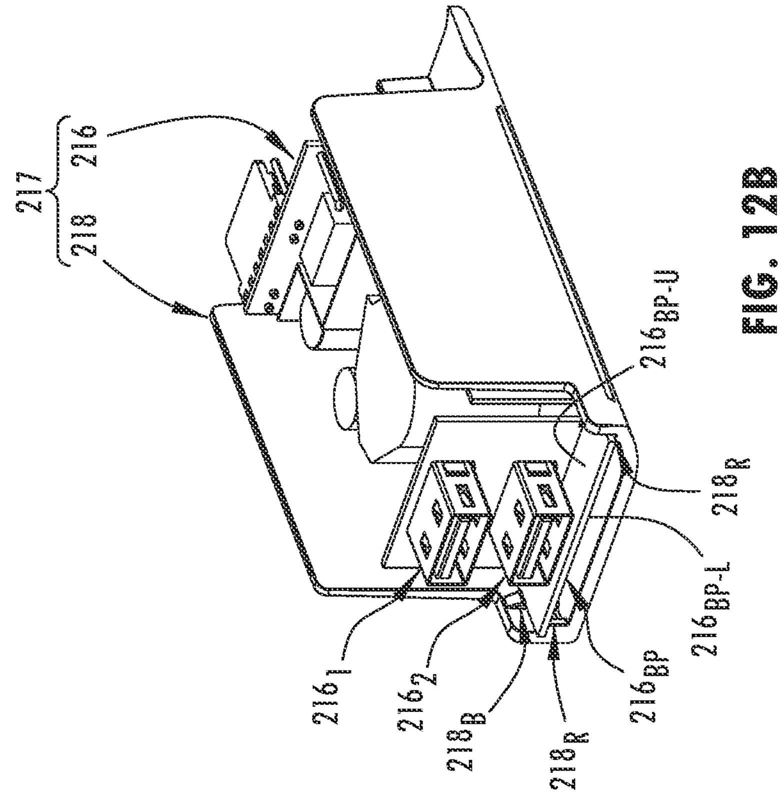
FIG. 12B is an assembled perspective view of the exemplary low voltage device assembly of FIG. 12A.
Figure 12A:
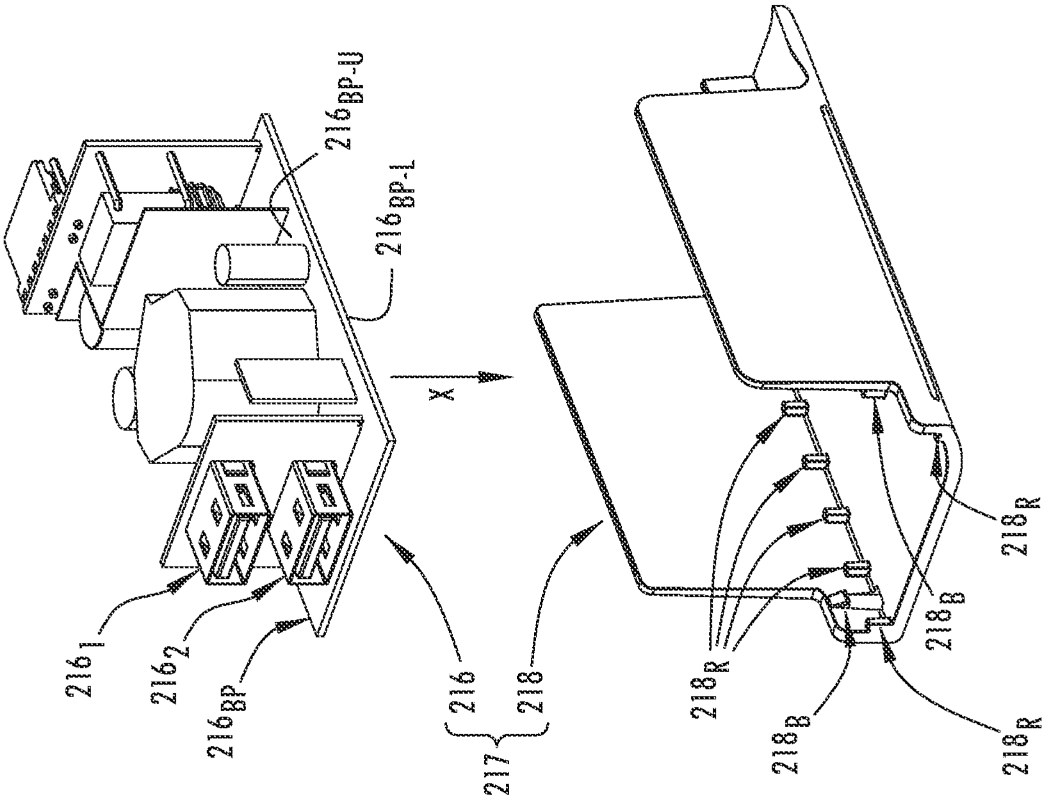
FIG. 12A is an exploded perspective view of an exemplary low voltage device assembly including the low voltage power supply cradle of FIGS. 10A-10C and the low voltage power supply circuit subassembly of FIGS. 11A-11C.
Figure 12D:
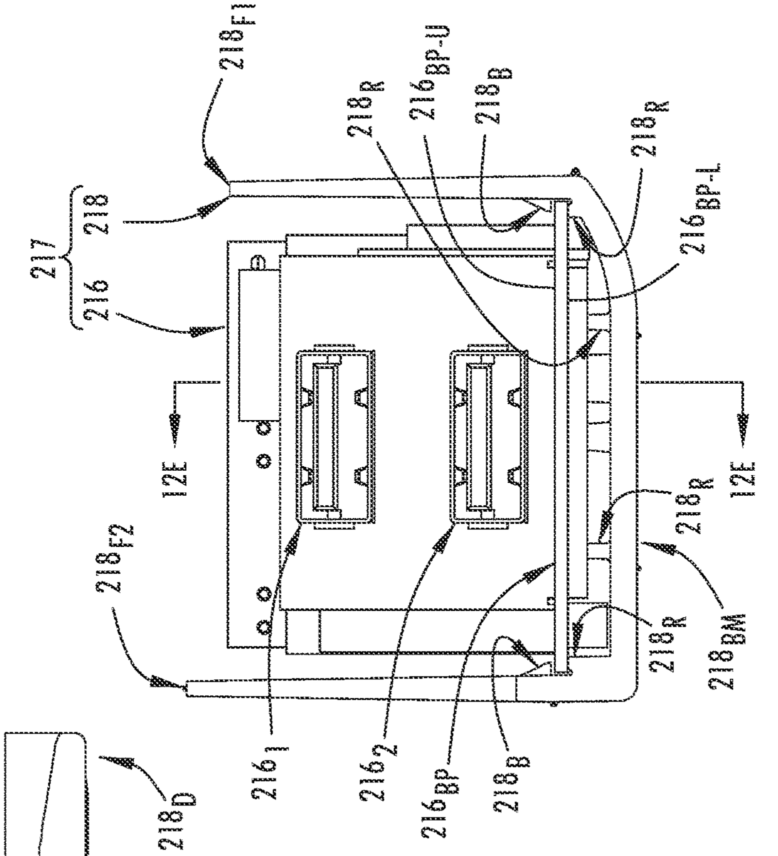
FIG. 12D is an assembled front view of the exemplary low voltage device assembly of FIG. 12A.
Figure 12C:
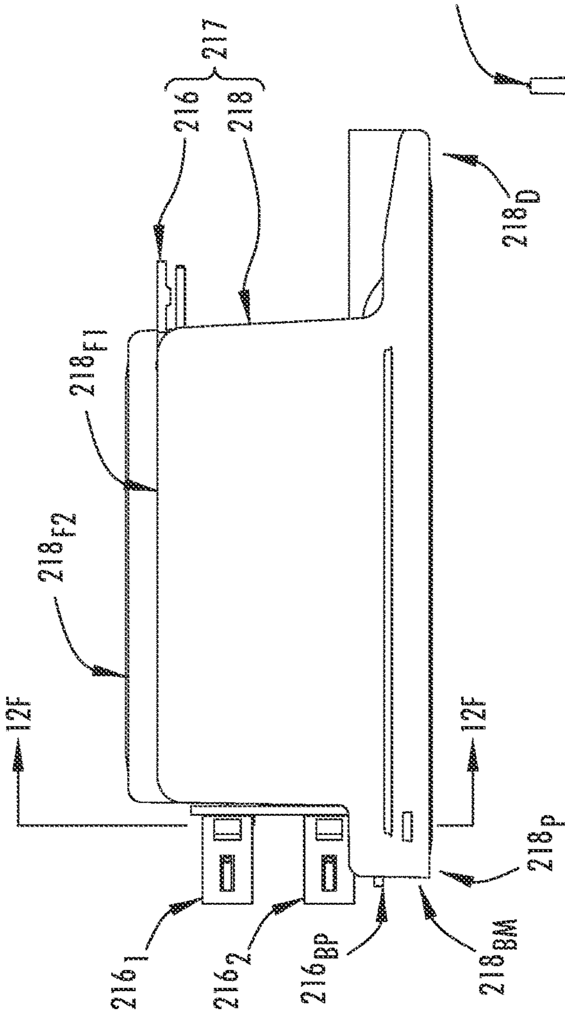
FIG. 12C is an assembled side view of the exemplary low voltage device assembly of FIG. 12A.
Figure 12E:
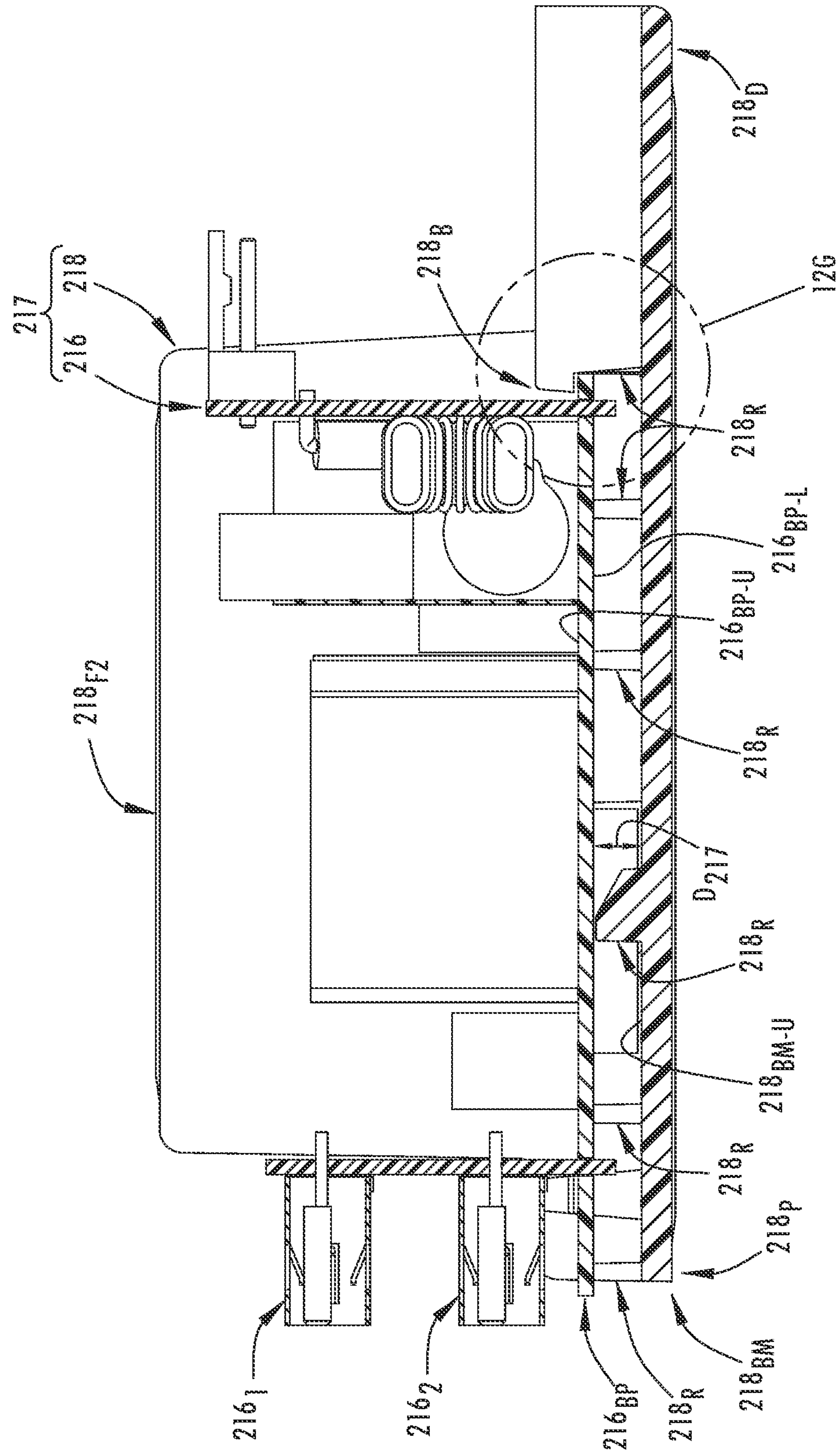
FIG. 12E is a cross-sectional view according to line 12E-12E of FIG. 12D.
Figure 12F:
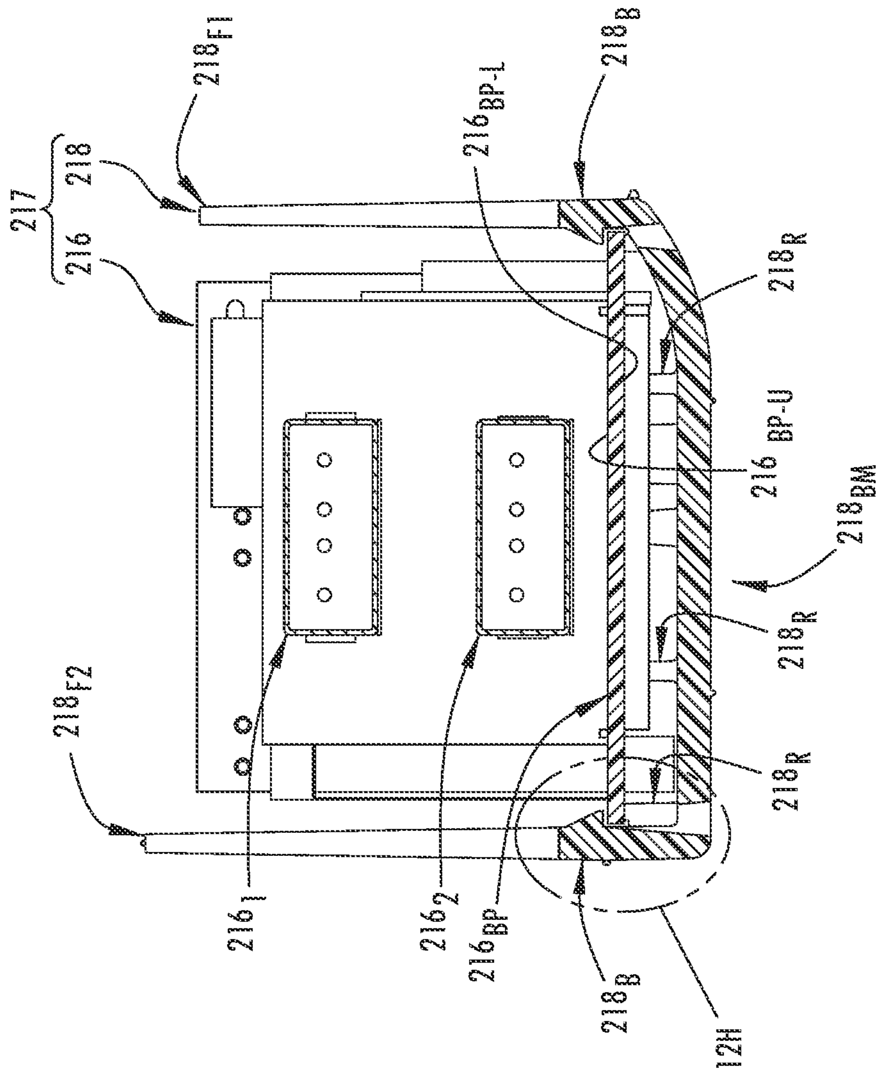
FIG. 12F is a cross-sectional view according to line 12E-12E of FIG. 12C.
Figure 12H:
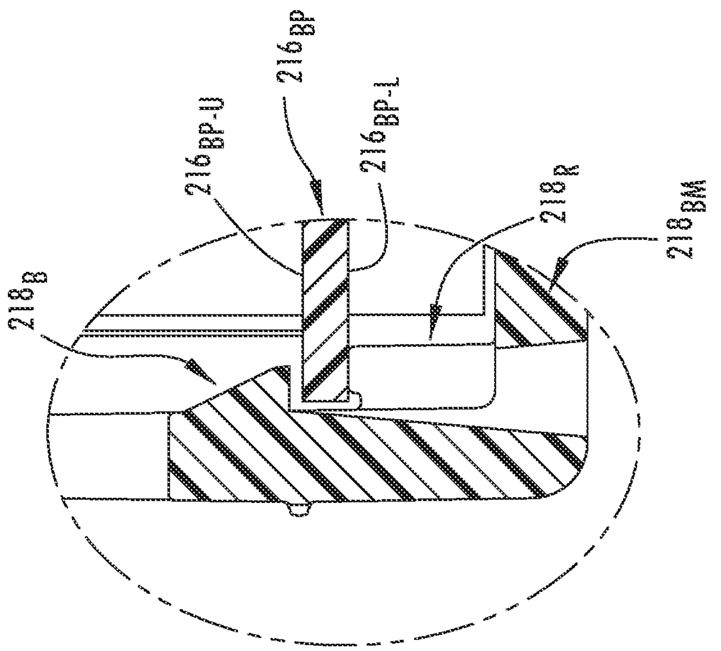
FIG. 12H is an enlarged view according to line 12H of FIG. 12F.
Figure 12G:
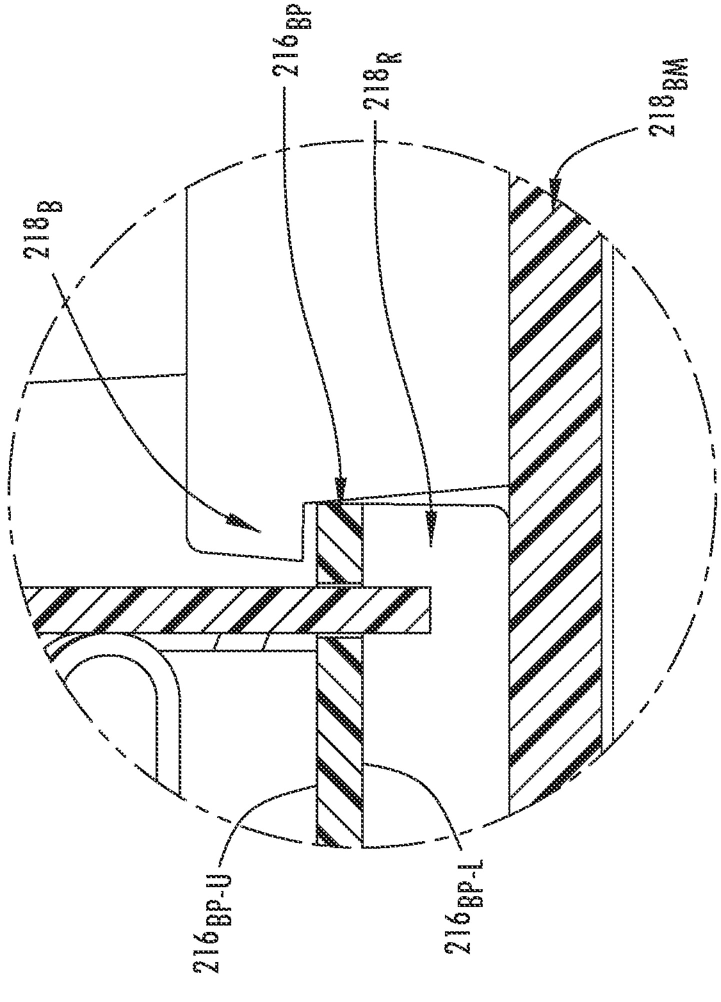
FIG. 12G is an enlarged view according to line 12G of FIG. 12E.

Referring to FIGS. 12A-12H, a plurality of views of the low voltage device assembly 217 (including the low voltage power supply circuit subassembly 216 and the low voltage power supply cradle 218) are shown. Firstly, as seen at FIG. 12A, the low voltage device assembly 217 is formed by, for example, axially lowering the low voltage power supply circuit subassembly 216 in a first direction according to the arrow X (which is opposite the direction of the arrow X' of FIG. 10A) toward the low voltage power supply cradle 218. The lower surface 216BP-L of the base plate 216BP of the low voltage power supply circuit subassembly 216 is axially urged adjacent the plurality of snap-fit barbs 218B when the low voltage power supply circuit subassembly 216 is lowered in the direction of the arrow X such that the plurality of snap-fit barbs 218B may temporarily deform or flex as the base plate 216BP of the low voltage power supply circuit subassembly 216 is axially urged past the plurality of snap-fit barbs 218B.

As seen at FIGS. 12B-12H, once the lower surface 216BP-L of the base plate 216BP of the low voltage power supply circuit subassembly 216 is axially moved past the plurality of snap-fit barbs 218B, the upper surface 216BP-U of the base plate 216BP is arranged axially under or axially opposite the plurality of snap-fit barbs 218B; in such an orientation, the low voltage power supply cradle 218 may be said to axially support and axially secure the low voltage power supply circuit subassembly 216 thereto. Furthermore, as seen at FIGS. 12B-12H, once the lower surface 216BP-L of the base plate 216BP of the low voltage power supply circuit subassembly 216 is axially moved past the plurality of snap-fit barbs 218B, the lower surface 216BP-L of the base plate 216BP of the low voltage power supply circuit subassembly 216 may be supported by or disposed over or upon the plurality of ribs 218R such that the lower surface 216BP-L of the base plate 216BP of the low voltage power supply circuit subassembly 216 may, for example, be spaced apart or arranged away from an upper surface 218BM-U base member 218BM of the low voltage power supply cradle 218 at, for example, a distance D217 (see, e.g., FIGS. 12E and 19).

Figure 14C:
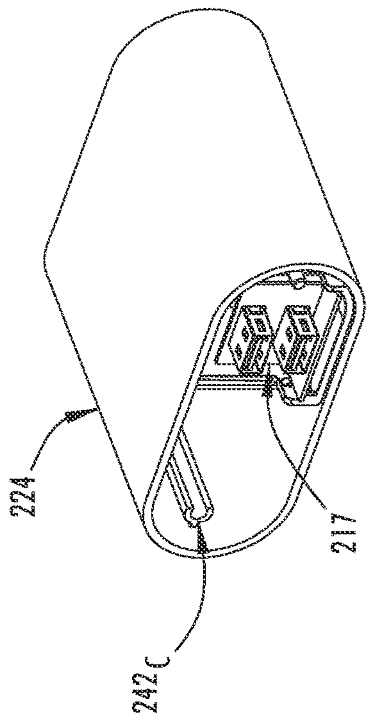
FIG. 14C is an assembled perspective view of the subassembly of the power receptacle assembly of FIG. 9 according to FIG. 14B.
Figure 14B:
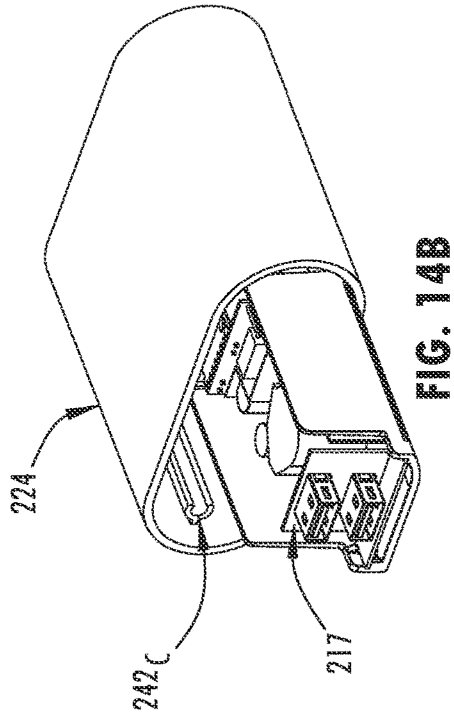
FIG. 14B is a partially assembled perspective view of the subassembly of the power receptacle assembly of FIG. 9 according to FIG. 14A.

Referring to FIGS. 13, 14A-14C, and 15, one or more of the lower inner surface 224L, the upper inner surface 224U, and the first inner side surface 224S1 of the housing 224 that forms at least a portion of the first sub-cavity **225*a* is configured to directly contact and directly support the low voltage power supply cradle 218 of the low voltage device assembly 217. As seen at FIGS. 14A-14C, the low voltage device assembly 217 is axially inserted into the first sub-cavity 225*a*** in a second direction according to the arrow Y. The second direction Y is different than the first direction X; in some instances, the second direction Y may be substantially orthogonal to the first direction X.

Figure 15:
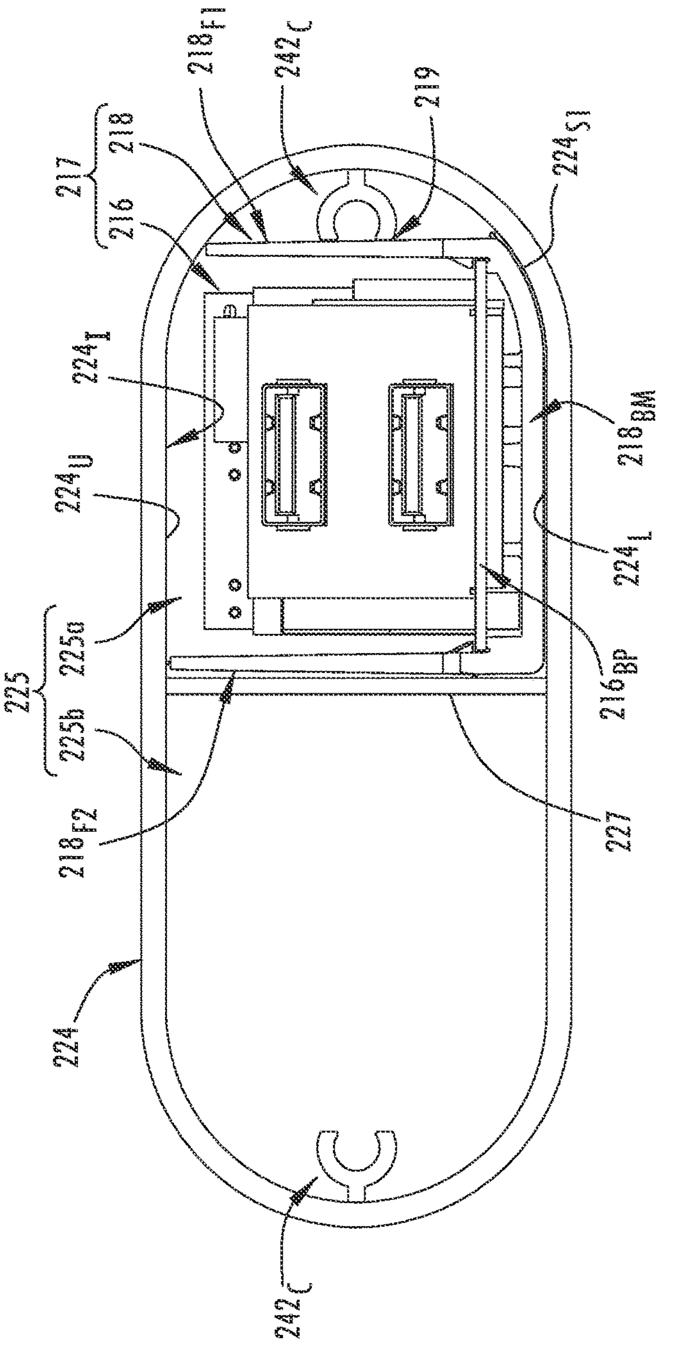
FIG. 15 is a front view of the subassembly of the power receptacle assembly of FIG. 9 according to FIG. 14C.

As seen at FIG. 15, in some implementations, all of the low voltage power supply circuit subassembly 216 (that also includes the base plate 216BP) does not directly contact any portion (see, e.g., the lower inner surface 224L, the upper inner surface 224U, the first inner side surface 224S1, and the second inner side surface 224S2) of the inner surface 224I that forms at least a portion of the first sub-cavity **225*a* of the housing 224. Furthermore, in some examples, the base plate 216BP of the low voltage power supply circuit subassembly 216 does not directly contact any portion (see, e.g., the lower inner surface 224L, the upper inner surface 224U, the first inner side surface 224S1, and the second inner side surface 224S2) of the inner surface 224I that forms at least a portion of the first sub-cavity 225*a* of the housing 224. Yet even further, the low voltage power supply cradle 218 is configured to be set or placed inside of the first sub-cavity 225*a* of the housing 224 according to the direction of the arrow Y without being slid into or slid into for engagement with any surface interruptions such as, for example, longitudinal or elongate: slots; grooves; channels; protrusions; or the like that extend from or is formed by or connected to the inner surface 224I that forms at least a portion of the first sub-cavity 225*a* of the housing 224; accordingly, in some implementations, at least one or more of the base member 218BM, the first sidewall 218F1, and the second sidewall 218F2 of the low voltage power supply cradle 218 may be configured to be disposed adjacent or contact one or more portions of the lower inner surface 224L, the upper inner surface 224U, the first inner side surface 224S1, and the second inner side surface 224S2 of the inner surface 224I that forms at least a portion of the first sub-cavity 225*a* of the housing 224. Furthermore, in some configurations, the one or more screw-receiving channels 242C do not come into contact with or engage any portion of the low voltage power supply cradle 218, such as, for example, the first sidewall 218F1 of the low voltage power supply cradle 218 (e.g., as seen at FIG. 15, a spacing or air gap 219 may be located between the first sidewall 218F1 of the low voltage power supply cradle 218 and the screw-receiving channel 242**C).

As seen at FIG. 1, in some configurations, the power receptacle assembly 10 may include: a faceplate 12; a faceplate insulator 14; an exemplary low voltage power supply circuit subassembly 16; an exemplary low voltage power supply cradle 18; a cushion pad 20; a heat sink bracket 22; a housing 24; a first nut 26; a PEM stud 28; a plurality of two port wire splicing connectors 30; a second nut 32; a wire jumper 34; a backplate 36; a power cord strain relief port 38; a power cord (including a removal of jacket (ROJ) at a first end and an AC plug at a second end) 40; a plurality of screws 42; and a housing label 44.

The faceplate 12 forms a plurality of openings including, for example, a first opening 121, a second opening 122, and a third opening 123. Similarly, the faceplate insulator 14 also forms plurality of openings including, for example, a first opening 141, a second opening 142, and a third opening 143. The low voltage power supply circuit subassembly 16 includes a plurality of power output receptacles including, for example, a first power output receptacle 161, a second power output receptacle 162, and a third power output receptacle 163.

The faceplate 12 and the faceplate insulator 14 are sized such that upon assembling the power receptacle assembly 10: (1) the first opening 121 of the faceplate 12 is aligned with the first opening 141 of the faceplate insulator 14; (2) the second opening 122 of the faceplate 12 is aligned with the second opening 142 of the faceplate insulator 14; and (3) the third opening 123 of the faceplate 12 is aligned with the third opening 143 of the faceplate insulator 14. Furthermore, when the power receptacle assembly 10 is assembled, the faceplate 12 and the faceplate insulator 14 are sized such that the corresponding first openings 121, 141, second openings 122, 142, and third openings 123, 143 reveal one or more portions of, for example, the low voltage power supply circuit subassembly 16 that is contained within and enclosed by the housing 24. The one or more revealed portions of the low voltage power supply circuit subassembly 16 may include, for example: the first power output receptacle 161 (that is aligned with the first openings 121, 141); the second power output receptacle 162 (that is aligned with the second openings 122, 142); and the third power output receptacle 163 (that is aligned with the third openings 123, 143).

One or more of the first, second, and third power output receptacles 161, 162, 163 may be low voltage power output receptacles. In some configurations, the low voltage power output receptacles 161, 162, 163 may include, for example: one or more universal serial bus (USB) ports (see, e.g., the first low voltage power output receptacle 161 and the second low voltage power output receptacle 162); one or more micro-USB ports (see, e.g., the third low voltage power output receptacle 163), or the like. The low voltage power output receptacles 161, 162, 163 may be sized to receive a correspondingly-sized plug or interface for the purpose of providing, for example, one or both of power and data to, for example, example, one or more: mobile phones; smartwatches; computers; computing devices; tablet computers; headphones; speakers; personal digital assistants; digital cameras; communications equipment; and the like. Accordingly, the power receptacle assembly 10 that includes the low voltage power supply circuit subassembly 16 may be sized to allow for compact design that is configured for placement in various locations in which packaging space is limited in, for example, an area where a plurality of power receptacles (e.g., the low voltage power output receptacles 161, 162, 163) are desired. The low voltage power supply circuit subassembly 16 of the power receptacle assembly 10 may include a power transformer for reducing a line voltage (e.g., 110V AC or 220V AC) that supplies electrical power to standard receptacle outlets, down to a lower voltage (such as, e.g., about 2V DC to about 20V DC), which is made available to users at the low voltage power output receptacles 161, 162, 163. Accordingly, the power receptacle assembly 10 converts or transforms standard line voltage to a lower voltage power output for use by low voltage power consumers (e.g., one or more: mobile phones; smartwatches; computers; computing devices; tablet computers; headphones; speakers; personal digital assistants; digital cameras; communications equipment; and the like).

With reference to FIGS. 1-4, the low voltage power supply circuit subassembly 16 converts or transforms a line voltage input received from the power cord 40 to the low voltage power output receptacles 161, 162, 163. The low voltage power supply circuit subassembly 16 and other components (seen at, e.g., reference numerals 14, 18-22, 26-34) may be connected to one another contained within the housing 24. The faceplate 12 may be secured to a front end of the housing 24 (e.g., in a friction-fit or adhesive connection), and the backplate 36 may be secured to a rear end of the housing 24 by the plurality of screws 42.

Figure 2:
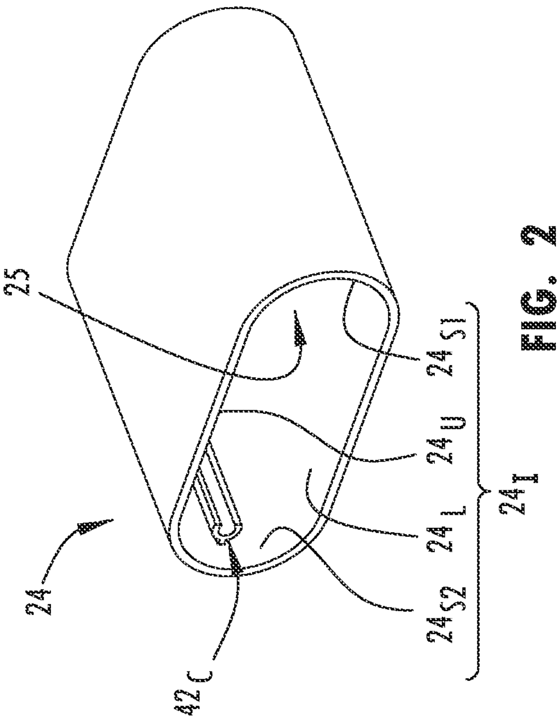
FIG. 2 is a perspective view of a housing of the power receptacle assembly of FIG. 1.
Figure 3:
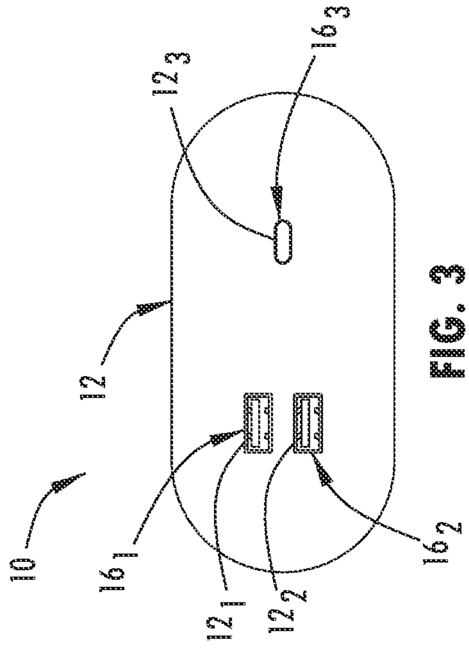
FIG. 3 is a front view of the power receptacle assembly of FIG. 1.
Figure 4:
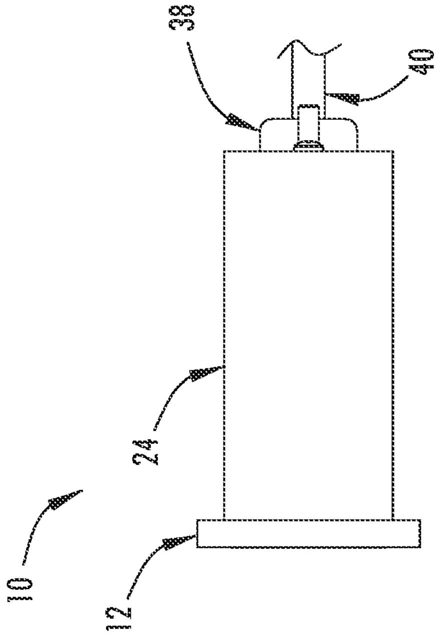
FIG. 4 is a side view of the power receptacle assembly of FIG. 1.

As seen at FIG. 2, the housing 24 may include an inner surface 24I that defines an interior cavity 25 of the housing 24. The inner surface 24I may be formed by, for example, a lower inner surface 24L, an upper inner surface 24U, a first inner side surface 24S1, and a second inner side surface 24S2. Each of the first inner side surface 24S1 and the second inner side surface 24S2 may include, for example, one or more screw-receiving channels 42C that are sized for receiving the plurality of screws 42 for the purpose of removably-securing the backplate 36 to the rear end of the housing 24. The remaining surface portions defining the inner surface 24I of the housing 24 do not include surface interruptions such as, for example, longitudinal or elongate: slots; grooves; channels; protrusions; or the like that may be otherwise sized for slidably-receiving, for example, any portion of the low voltage power supply circuit subassembly 16 such as, for example, a base plate (see, e.g., base plate 16BP) of the low voltage power supply circuit subassembly 16.

With reference to FIG. 1, in some configurations, the low voltage power supply cradle 18 may be configured include one or more protrusions (see, e.g., one or more snap-fit barbs 18B and one or more ribs 18R) that retain and support the base plate 16BP of the low voltage power supply circuit subassembly 16 for forming a low voltage device assembly 17 (that is substantially similar in structure, function, use, and assembly thereof with respect to the housing 24 as described above at FIGS. 10A-15 with respect to the low voltage device assembly 217 and the housing 224). The one or more protrusions 18B, 18R may, in some configurations, not be elongate (i.e., the one or more protrusions 18B, 18R do not extend along a length of the low voltage power supply cradle 18 between approximately, for example, a proximal end of the low voltage power supply cradle 18 and a distal end of the low voltage power supply cradle 18. Accordingly, the low voltage device assembly 17 may be interfaced with the cavity 25 of the housing 24 in a substantially similar manner as described above with respect to how the low voltage device assembly 217 is interfaced with the first sub-cavity 225*a* of the cavity 225 of the housing 224.

Figure 5:
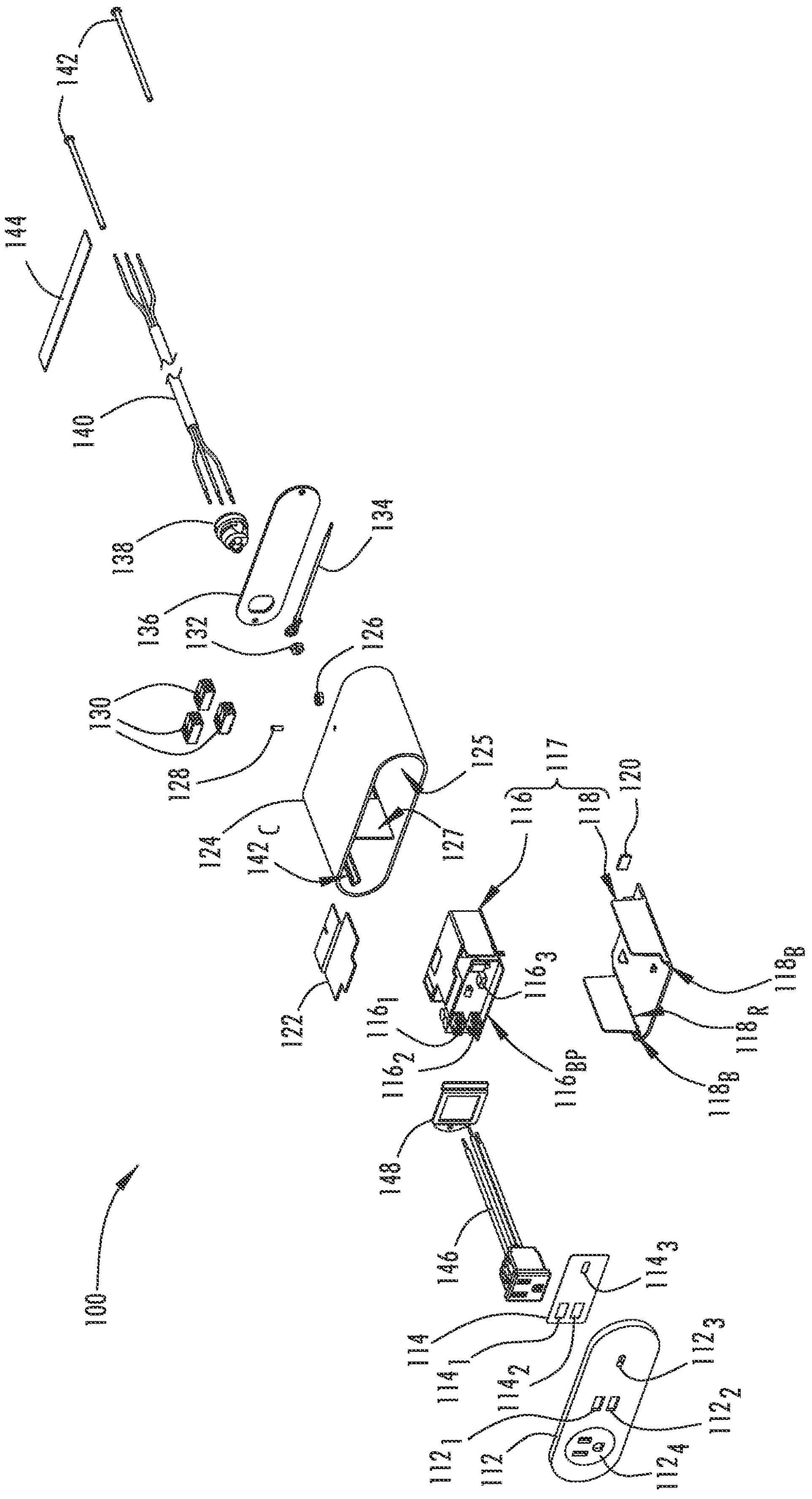
FIG. 5 is an exploded perspective view of an exemplary power receptacle assembly.

An exemplary power receptacle assembly is shown generally at 100 at FIGS. 5-8. As seen at FIG. 5, in some configurations, the power receptacle assembly 100 may include: a faceplate 112; a faceplate insulator 114; an exemplary low voltage power supply circuit subassembly 116; an exemplary low voltage power supply cradle 118; a cushion pad 120; a heat sink bracket 122; a housing 124; a first nut 126; a PEM stud 128; a plurality of three port wire splicing connectors 130; a second nut 132; a wire jumper 134; a backplate 136; a power cord strain relief port 138; a power cord (including a removal of jacket (ROJ) at a first end and an AC plug at a second end) 140; a plurality of screws 142; a housing label 144; an AC receptacle with wire leads 146; and an AC plate enclosure 148.

The faceplate 112 forms a plurality of openings including, for example, a first opening 1121, a second opening 1122, a third opening 1123, and a fourth opening 1124. Similarly, the faceplate insulator 114 also forms plurality of openings including, for example, a first opening 1141, a second opening 1142, and a third opening 1143.

The low voltage power supply circuit subassembly 116 includes a plurality of power output receptacles including, for example, a first power output receptacle 1161, a second power output receptacle 1162, and a third power output receptacle 1163. Unlike the power receptacle assembly 10, which includes three power outlet receptacles (161, 162, 163), the power receptacle assembly 100 includes a fourth power receptacle defined by the AC receptacle with wire leads 146. As seen at FIG. 5, the AC receptacle with wire leads 146 is separately formed from the low voltage power supply circuit subassembly 116 and may receive power from the power cord 140.

The faceplate 112 and the faceplate insulator 114 are sized such that upon assembling the receptacle assembly 100: (1) the first opening 1121 of the faceplate 112 is aligned with the first opening 1141 of the faceplate insulator 114; (2) the second opening 1122 of the faceplate 112 is aligned with the second opening 1142 of the faceplate insulator 114; and (3) the third opening 1123 of the faceplate 112 is aligned with the third opening 1143 of the faceplate insulator 114. Furthermore, when the power receptacle assembly 100 is assembled, the faceplate 112 and the faceplate insulator 114 are sized such that the corresponding first openings 1121, 1141, second openings 1122, 1142, and third openings 1123, 1143 reveal one or more portions of, for example, the low voltage power supply circuit subassembly 116 that is contained within and enclosed by the housing 124. The one or more revealed portions of the low voltage power supply circuit subassembly 116 may include, for example: the first power output receptacle 1161 (that is aligned with the first openings 1121, 1141); the second power output receptacle 1162 (that is aligned with the second openings 1122, 1142); and the third power output receptacle 1163 (that is aligned with the third openings 1123, 1143). Because the fourth power receptacle defined by the AC receptacle with wire leads 146 is separately formed from the low voltage power supply circuit subassembly 116, the fourth opening 1124 of the faceplate 112 reveals the AC receptacle with wire leads 146 that is contained within and enclosed by the housing 124.

One or more of the first, second, and third power output receptacles 1161, 1162, 1163 may be low voltage power output receptacles. In some configurations, the low voltage power output receptacles 1161, 1162, 1163 may include, for example: one or more universal serial bus (USB) ports (see, e.g., the first low voltage power output receptacle 1161 and the second low voltage power output receptacle 1162); one or more micro-USB ports (see, e.g., the third low voltage power output receptacle 1163) or the like. Furthermore, the AC receptacle with wire leads 146 may be an AC line voltage power output receptacle that receives power from the power cord 140. Accordingly, the power output receptacles 1161, 1162, 1163 and the AC receptacle with wire leads 146 may be sized to receive a correspondingly-sized plug or interface for the purpose of providing, for example, one or both of power and data to, for example, example, one or more: mobile phones; smartwatches; computers; computing devices; tablet computers; headphones; speakers; personal digital assistants; digital cameras; communications equipment; and the like. Accordingly, the power receptacle assembly 100 that includes the low voltage power supply circuit subassembly 116 and the AC receptacle with wire leads 146 may be sized to allow for compact design that is configured for placement in various locations in which packaging space is limited in, for example, an area where a plurality of power receptacles (e.g., the power output receptacles 1161, 1162, 1163, 146) are desired. The low voltage power supply circuit subassembly 116 of the power receptacle assembly 100 may include a power transformer for reducing a line voltage (e.g., 110V AC or 220V AC) that supplies electrical power to standard receptacle outlets, down to a lower voltage (such as, e.g., about 2V DC to about 20V DC), which is made available to users at the power output receptacles 1161, 1162, 1163. Accordingly, the power receptacle assembly 100 converts or transforms standard line voltage to a lower voltage power output for use by low voltage power consumers (e.g., one or more: mobile phones; smartwatches; computers; computing devices; tablet computers; headphones; speakers; personal digital assistants; digital cameras; communications equipment; and the like).

With reference to FIGS. 5-8, the low voltage power supply circuit subassembly 116 converts or transforms a line voltage input received from the power cord 140 to the low voltage power output receptacles 1161, 1162, 1163. The low voltage power supply circuit subassembly 116 and other components (seen at, e.g., reference numerals 114, 118-122, 126-134, 146-148) may be connected to one another contained within the housing 124. The faceplate 112 may be secured to a front end of the housing 124 and the backplate 136 may be secured to a rear end of the housing 124 by the plurality of elongated screws 142 that extend through the backplate 136 and the housing 124 to threadbly engage threaded embossments disposed at a rear surface of the faceplate 112. Thus, tightening of the elongated screws 142 draws the faceplate 112 toward the backplate 136, so as to compressively sandwich the housing 124 between the faceplate and the backplate. In additional examples, the faceplate and/or the backplate may be connected to the housing in a friction-fit or adhesive connection or the like.

Figure 6:
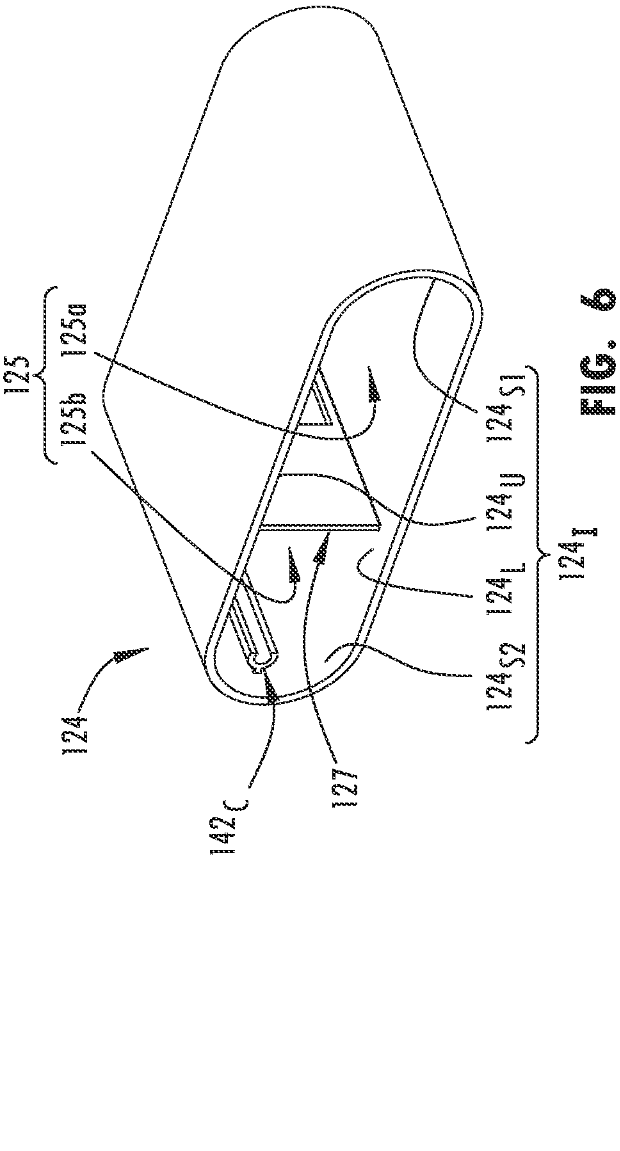
FIG. 6 is a perspective view of a housing of the power receptacle assembly of FIG. 5.
Figure 7:
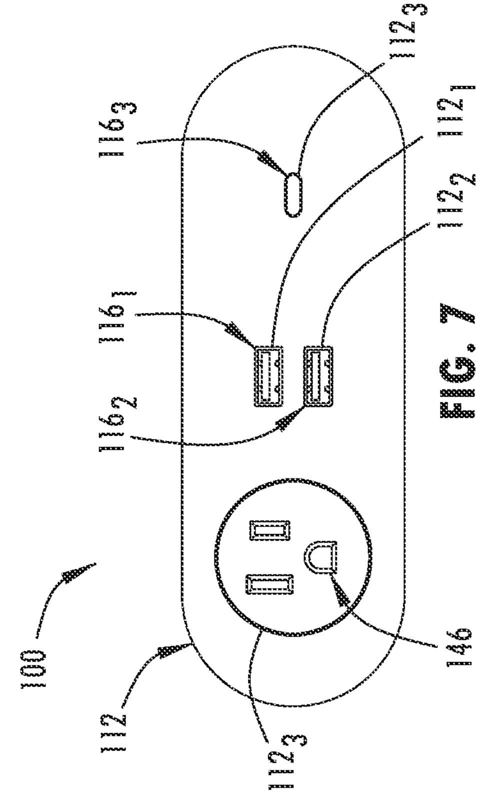
FIG. 7 is a front view of the power receptacle assembly of FIG. 5.
Figure 8:
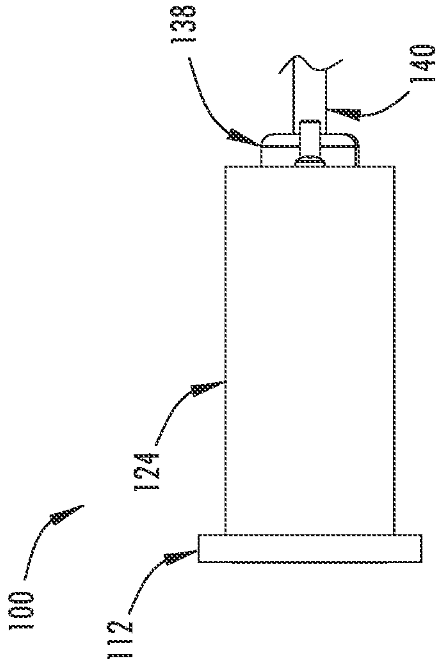
FIG. 8 is a side view of the power receptacle assembly of FIG. 5.

As seen at FIG. 6, the housing 124 may include an inner surface 124I that defines an interior cavity 125 of the housing 124. Furthermore, the housing 124 may include an interior wall 127 that subdivides the interior cavity 125 into a first sub-cavity 125*a* that is sized for containing the low voltage power supply circuit subassembly 116 and a second sub-cavity 125*b* that is sized for containing the AC receptacle with wire leads 146.

The inner surface 124I of the housing 124 may be formed by, for example, a lower inner surface 124L, an upper inner surface 124U, a first inner side surface 124S1, and a second inner side surface 124S2. Each of the first inner side surface 124S1 and the second inner side surface 124S2 may include, for example, one or more screw-receiving channels 142C that are sized for receiving the plurality of screws 142 for the purpose of removably-securing the backplate 136 to the rear end of the housing 124. The remaining surface portions defining the inner surface 124I of the housing 124 do not include surface interruptions such as, for example, longitudinal or elongate: slots; grooves; channels; protrusions; or the like that may be otherwise sized for slidably-receiving, for example, any portion of the low voltage power supply circuit subassembly 116 such as, for example, a base plate (see, e.g., base plate 116BP) of the low voltage power supply circuit subassembly 116 within, for example, the first sub-cavity 125*a*.

With reference to FIG. 5, in some configurations, the low voltage power supply cradle 118 may be configured include one or more protrusions (see, e.g., one or more snap-fit barbs 118B and one or more ribs 118R) that retain and support the base plate 116BP of the low voltage power supply circuit subassembly 116 for forming a low voltage device assembly 117 (that is substantially similar in structure, function, use, and assembly thereof with respect to the housing 224 as described above at FIGS. 10A-15 with respect to the low voltage device assembly 217 and the housing 224). The one or more protrusions 118B, 118R may, in some configurations, not be elongate (i.e., the one or more protrusions 118B, 118R do not extend along a length of the low voltage power supply cradle 118 between approximately, for example, a proximal end of the low voltage power supply cradle 118 and a distal end of the low voltage power supply cradle 118. Accordingly, the low voltage device assembly 117 may be interfaced with the first sub-cavity 125*a* of the cavity 125 of the housing 124 in a substantially similar manner as described above with respect to how the low voltage device assembly 217 is interfaced with the first sub-cavity 225*a* of the cavity 225 of the housing 224.

Figure 20:
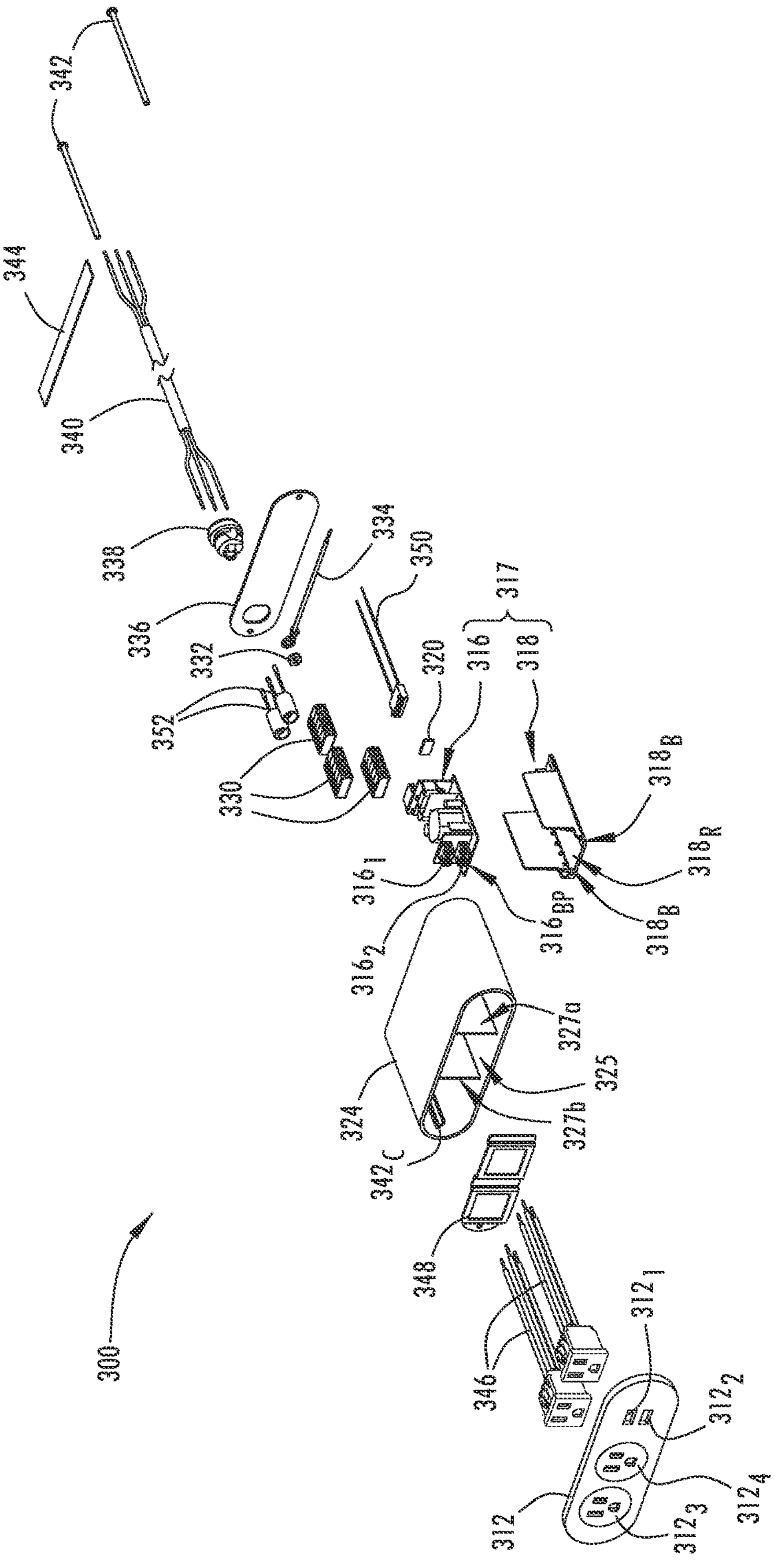
FIG. 20 is an exploded perspective view of an exemplary power receptacle assembly.

An exemplary power receptacle assembly is shown generally at 300 at FIGS. 20-23. As seen at FIG. 20, in some configurations, the power receptacle assembly 300 may include: a faceplate 312; an exemplary low voltage power supply circuit subassembly 316; an exemplary low voltage power supply cradle 318; a cushion pad 320; a housing 324; a plurality of five port wire splicing connectors 330; a nut 332; a wire jumper 334; a backplate 336; a power cord strain relief port 338; a power cord (including a removal of jacket (ROJ) at a first end and a ROJ or an AC plug at a second end) 340; a plurality of screws 342; a housing label 344; a plurality of AC receptacles with wire leads 346; a plurality of AC plate enclosures 348; a wire harness 350; and capacitor tube crimps 352.

The faceplate 312 forms a plurality of openings including, for example, a first opening 3121, a second opening 3122, a third opening 3123, and a fourth opening 3124. The low voltage power supply circuit subassembly 316 includes a plurality of power output receptacles including, for example, a first power output receptacle 3161 and a second power output receptacle 3162. Unlike the power receptacle assembly 10, which includes three power outlet receptacles (161, 162, 163), the power receptacle assembly 300 includes a fourth power outlet receptacle. Furthermore, two of the four power outlets of the power receptacle assembly 300 includes a plurality of AC receptacles with wire leads 346. As seen at FIG. 20, each AC receptacle with wire leads 346 is separately formed from the low voltage power supply circuit subassembly 316 and may receive power from the power cord 340.

When the power receptacle assembly 300 is assembled, the faceplate 312 is sized such that the first opening 3121 and the second opening 3122 reveal one or more portions of, for example, the low voltage power supply circuit subassembly 316 that is contained within and enclosed by the housing 324. The one or more revealed portions of the low voltage power supply circuit subassembly 316 may include, for example: the first power output receptacle 3161 (that is aligned with the first opening 3121); and the second power output receptacle 3162 (that is aligned with the second opening 3122). Because the third and the fourth power receptacles defined by, respectively first and second AC receptacles with wire leads 346 are separately formed from the low voltage power supply circuit subassembly 316, the third opening 3123 and the fourth opening 3124 of the faceplate 312 respectively reveal the first and second AC receptacles with wire leads 346 that are contained within and enclosed by the housing 324.

One or more of the first and second power output receptacles 3161, 3162 may be low voltage power output receptacles. In some configurations, the low voltage power output receptacles 3161, 3162 may include, for example: one or more universal serial bus (USB) ports (see, e.g., the first low voltage power output receptacle 3161 and the second low voltage power output receptacle 3162); one or more micro-USB ports (not shown) or the like. Furthermore, first and second AC receptacles with wire leads 346 may be AC line voltage power output receptacles that receive power from the power cord 340. Accordingly, the power output receptacles 3161, 3162 and the first and second AC receptacles with wire leads 346 may be sized to receive a correspondingly-sized plug or interface for the purpose of providing, for example, one or both of power and data to, for example, example, one or more: mobile phones; smartwatches; computers; computing devices; tablet computers; headphones; speakers; personal digital assistants; digital cameras; communications equipment; and the like. Accordingly, the power receptacle assembly 300 that includes the low voltage power supply circuit subassembly 316 and the first and second AC receptacles with wire leads 346 may be sized to allow for compact design that is configured for placement in various locations in which packaging space is limited in, for example, an area where a plurality of power receptacles (e.g., the power output receptacles 3161, 3162 346) are desired. The low voltage power supply circuit subassembly 316 of the power receptacle assembly 300 may include a power transformer for reducing a line voltage (e.g., 110V AC or 220V AC) that supplies electrical power to standard receptacle outlets, down to a lower voltage (such as, e.g., about 2V DC to about 20V DC), which is made available to users at the power output receptacles 3161, 3162. Accordingly, the power receptacle assembly 300 converts or transforms standard line voltage to a lower voltage power output for use by low voltage power consumers (e.g., one or more: mobile phones; smartwatches; computers; computing devices; tablet computers; headphones; speakers; personal digital assistants; digital cameras; communications equipment; and the like).

With reference to FIGS. 20-23, the low voltage power supply circuit subassembly 316 converts or transforms a line voltage input received from the power cord 340 to the low voltage power output receptacles 3161, 3162. The low voltage power supply circuit subassembly 316 and other components (seen at, e.g., reference numerals 318-320, 330-334, 346-352) may be connected to one another contained within the housing 324. The faceplate 312 may be secured to a front end of the housing 324 (e.g., in a friction-fit or adhesive connection), and the backplate 336 may be secured to a rear end of the housing 324 by the plurality of screws 342.

Figure 21:
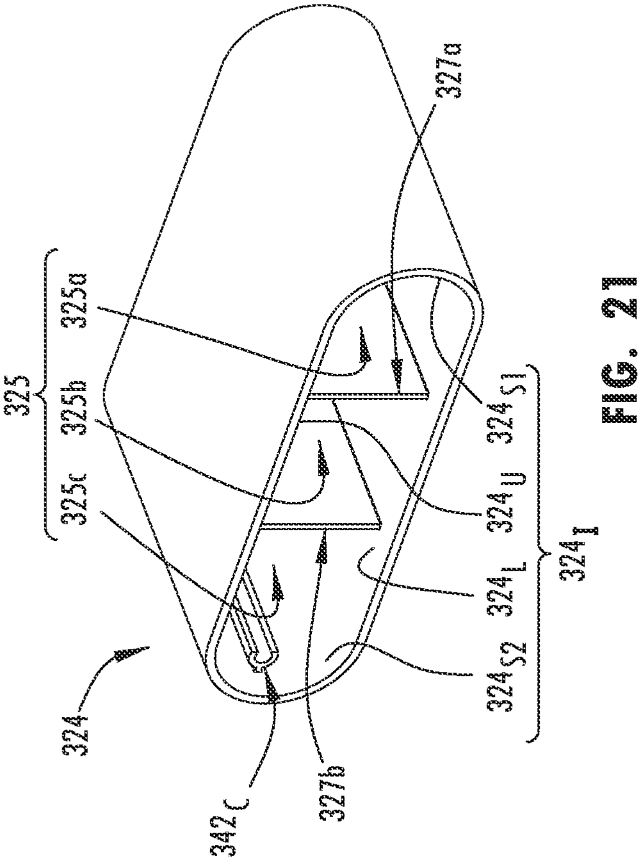
FIG. 21 is a perspective view of a housing of the power receptacle assembly of FIG. 20.
Figure 23:
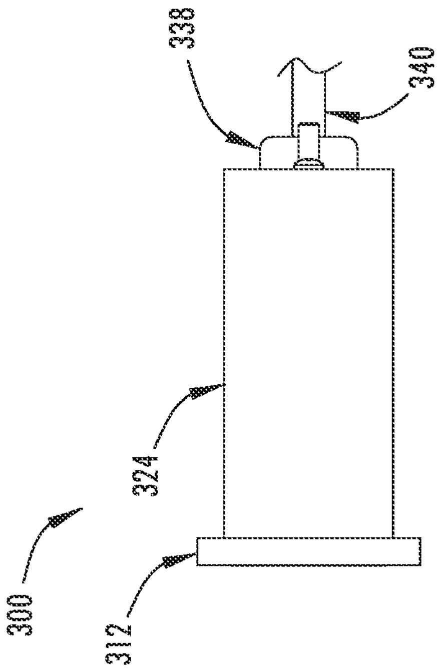
FIG. 23 is a side view of the power receptacle assembly of FIG. 20.
Figure 22:
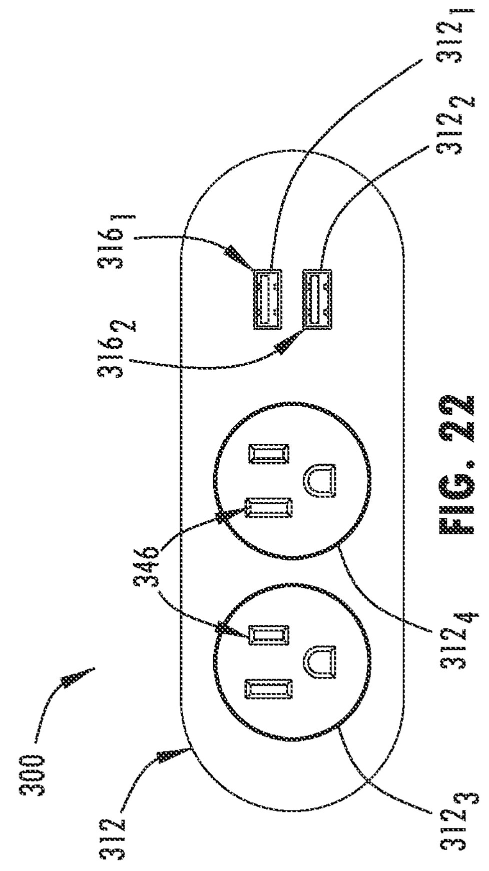
FIG. 22 is a front view of the power receptacle assembly of FIG. 20.

As seen at FIG. 21, the housing 324 may include an inner surface 3241 that defines an interior cavity 325 of the housing 324. Furthermore, the housing 324 may include a first interior wall **327*a* and a second interior wall 327*b* that subdivides the interior cavity 325 into: (1) a first sub-cavity 325*a* that is sized for containing the low voltage power supply circuit subassembly 316; (2) a second sub-cavity 325*b* that is sized for containing the first AC receptacle with wire leads 346; and (3) a third sub-cavity 325*c* that is sized for containing the second AC receptacle with wire leads 346**.

The inner surface 3241 of the housing 324 may be formed by, for example, a lower inner surface 324L, an upper inner surface 324U, a first inner side surface 324S1, and a second inner side surface 324S2. Each of the first inner side surface 324S1 and the second inner side surface 324S2 may include, for example, one or more screw-receiving channels 342C that are sized for receiving the plurality of screws 342 for the purpose of removably-securing the backplate 336 to the rear end of the housing 324. The remaining surface portions defining the inner surface 3241 of the housing 324 do not include surface interruptions such as, for example, longitudinal or elongate: slots; grooves; channels; protrusions; or the like that may be otherwise sized for slidably-receiving, for example, any portion of the low voltage power supply circuit subassembly 316 such as, for example, a base plate (see, e.g., base plate 316BP) of the low voltage power supply circuit subassembly 316 within, for example, the first sub-cavity **325*a***.

With reference to FIG. 20, in some configurations, the low voltage power supply cradle 318 may be configured include one or more protrusions (see, e.g., one or more snap-fit barbs 318B and one or more ribs 318R) that retain and support the base plate 316BP of the low voltage power supply circuit subassembly 316 for forming a low voltage device assembly 317 (that is substantially similar in structure, function, use, and assembly thereof with respect to the housing 224 as described above at FIGS. 10A-15 with respect to the low voltage device assembly 217 and the housing 224). The one or more protrusions 318B, 318R may, in some configurations, not be elongate (i.e., the one or more protrusions 318B, 318R do not extend along a length of the low voltage power supply cradle 318 between approximately, for example, a proximal end of the low voltage power supply cradle 318 and a distal end of the low voltage power supply cradle 318. Accordingly, the low voltage device assembly 317 may be interfaced with the first sub-cavity **325*a* of the cavity 325 of the housing 324 in a substantially similar manner as described above with respect to how the low voltage device assembly 217 is interfaced with the first sub-cavity 225*a* of the cavity 225 of the housing 224**.

Figure 24:
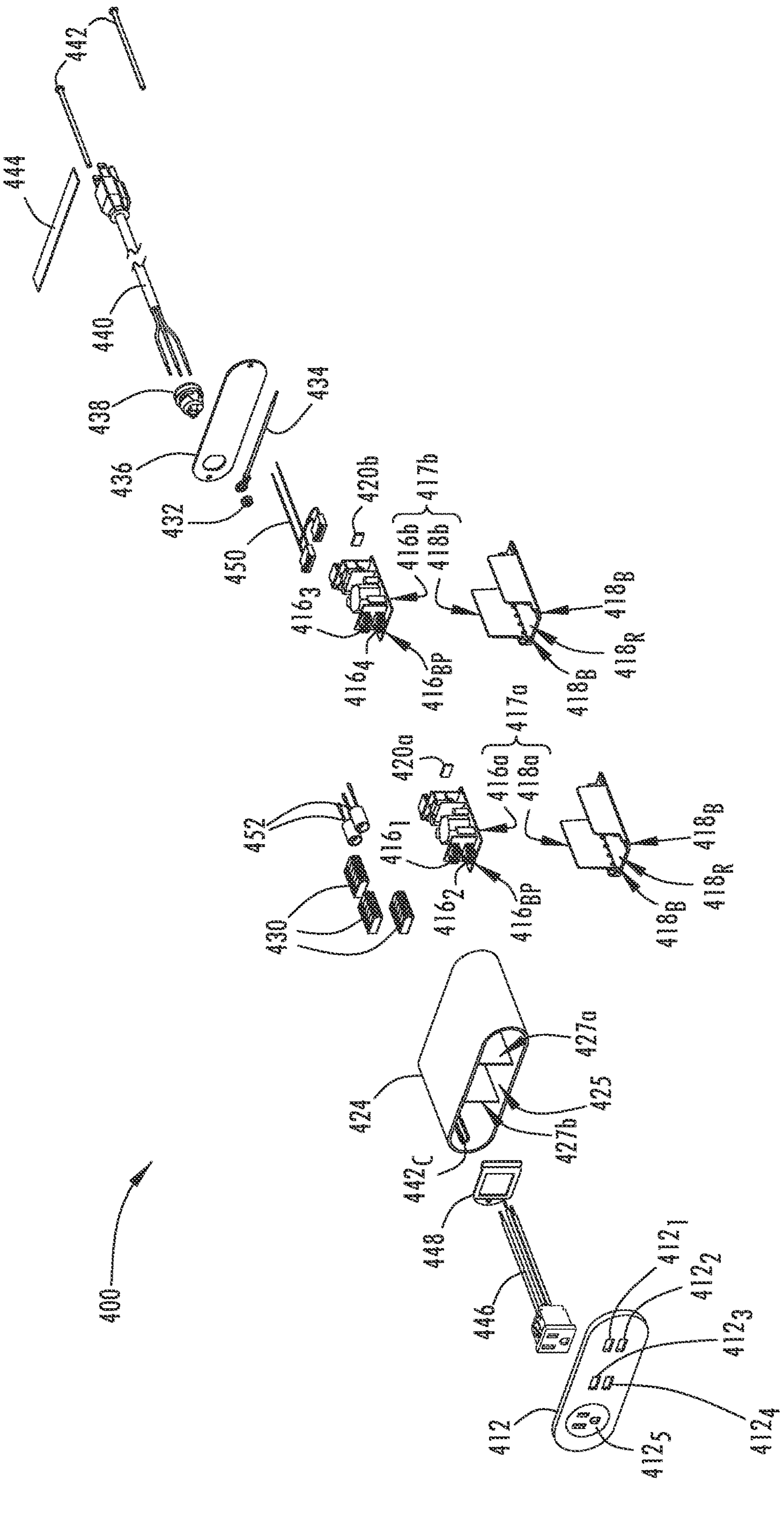
FIG. 24 is an exploded perspective view of an exemplary power receptacle assembly.

An exemplary power receptacle assembly is shown generally at 400 at FIGS. 24-27. As seen at FIG. 24, in some configurations, the power receptacle assembly 400 may include: a faceplate 412; a plurality of exemplary low voltage power supply circuit subassemblies including a first exemplary low voltage power supply circuit subassembly **416*a* and a second exemplary low voltage power supply circuit subassembly 416*b*; a plurality of exemplary low voltage power supply cradles including a first exemplary low voltage power supply cradle 418*a* and a second exemplary low voltage power supply cradle 418*b*; a first cushion pad 420*a*; a second cushion pad 420*b*; a housing 424; a plurality of five port wire splicing connectors 430; a nut 432; a wire jumper 434; a backplate 436; a power cord strain relief port 438; a power cord (including a removal of jacket (ROJ) at a first end and a ROJ or an AC plug at a second end) 440; a plurality of screws 442; a housing label 444; an AC receptacle with wire leads 446; an AC plate enclosure 448; a double wire harness 450; and capacitor tube crimps 452**.

The faceplate 412 forms a plurality of openings including, for example, a first opening 4121, a second opening 4122, a third opening 4123, a fourth opening 4124, and a fifth opening 4125. The first low voltage power supply circuit subassembly 416*a* includes a plurality of power output receptacles including, for example, a first power output receptacle 4161 and a second power output receptacle 4162. The second low voltage power supply circuit subassembly 416*b* includes a plurality of power output receptacles including, for example, a third power output receptacle 4163 and a fourth power output receptacle 4164. Unlike the power receptacle assembly 10, which includes three power outlet receptacles (161, 162, 163) and the power receptacle assembly 300, which includes four power outlet receptacles (3161, 3162, 3163, 346), the power receptacle assembly 400 includes a fifth power outlet receptacle. Furthermore, one of the five power outlets of the power receptacle assembly 400 includes an AC receptacle with wire leads 446. As seen at FIG. 24, the AC receptacle with wire leads 446 is separately formed from each of the first low voltage power supply circuit subassembly 416*a* and the second low voltage power supply circuit subassembly 416*b*. Furthermore, the AC receptacle with wire leads 446 may receive power from the power cord 440.

When the power receptacle assembly 400 is assembled, the faceplate 412 is sized such that the first opening 4121 and the second opening 4122 reveal one or more portions of, for example, the first low voltage power supply circuit subassembly 416*a* that is contained within and enclosed by the housing 424. The one or more revealed portions of the first low voltage power supply circuit subassembly 416*a* may include, for example: the first power output receptacle 4161 (that is aligned with the first opening 4121); and the second power output receptacle 4162 (that is aligned with the second opening 4122). Furthermore, when the power receptacle assembly 400 is assembled, the faceplate 412 is sized such that the third opening 4123 and the fourth opening 4124 reveal one or more portions of, for example, the second low voltage power supply circuit subassembly 416*b* that is contained within and enclosed by the housing 424. The one or more revealed portions of the second low voltage power supply circuit subassembly 416*b* may include, for example: the third power output receptacle 4163 (that is aligned with the third opening 4123); and the fourth power output receptacle 4164 (that is aligned with the fourth opening 4124). Because the fifth power receptacle that is defined by the AC receptacle with wire leads 446 is separately formed from both of the first low voltage power supply circuit subassembly 416*a* and the second low voltage power supply circuit subassembly 416*b*, the fifth opening 4125 of the faceplate 412 reveals the AC receptacle with wire leads 446 that is contained within and enclosed by the housing 424.

One or more of the first, second, third, and fourth power output receptacles 4161, 4162, 4163, 4164 may be low voltage power output receptacles. In some configurations, the low voltage power output receptacles 4161, 4162, 4163, 4164 may include, for example: one or more universal serial bus (USB) ports (see, e.g., the first low voltage power output receptacle 4161, the second low voltage power output receptacle 4162, the third low voltage power output receptacle 4163, and the fourth low voltage power output receptacle 4164); one or more micro-USB ports (not shown) or the like. Furthermore, the AC receptacle with wire leads 446 may be an AC line voltage power output receptacle that receives power from the power cord 440. Accordingly, the power output receptacles 4161, 4162, 4163, 4164 and the AC receptacle with wire leads 446 may be sized to receive a correspondingly-sized plug or interface for the purpose of providing, for example, one or both of power and data to, for example, example, one or more: mobile phones; smartwatches; computers; computing devices; tablet computers; headphones; speakers; personal digital assistants; digital cameras; communications equipment; and the like. Accordingly, the power receptacle assembly 400 that includes the first low voltage power supply circuit subassembly 416*a*, the second low voltage power supply circuit subassembly 416*b*, and the AC receptacle with wire leads 446 may be sized to allow for compact design that is configured for placement in various locations in which packaging space is limited in, for example, an area where a plurality of power receptacles (e.g., the power output receptacles 4161, 4162, 4163, 4164, 446) are desired. Each of the first low voltage power supply circuit subassembly 416*a* and the second low voltage power supply circuit subassembly 416*b* of the power receptacle assembly 400 may include a power transformer for reducing a line voltage (e.g., 110V AC or 220V AC) that supplies electrical power to standard receptacle outlets, down to a lower voltage (such as, e.g., about 2V DC to about 20V DC), which is made available to users at the power output receptacles 4161, 4162, 4163, 4164. Accordingly, the power receptacle assembly 400 converts or transforms standard line voltage to a lower voltage power output for use by low voltage power consumers (e.g., one or more: mobile phones; smartwatches; computers; computing devices; tablet computers; headphones; speakers; personal digital assistants; digital cameras; communications equipment; and the like).

With reference to FIGS. 24-27, both of the first low voltage power supply circuit subassembly 416*a* and the second low voltage power supply circuit subassembly 416*b* converts or transforms a line voltage input received from the power cord 440 to the low voltage power output receptacles 4161, 4162, 4163, 4164. The first low voltage power supply circuit subassembly 416*a*, the second low voltage power supply circuit subassembly 416*b*, and other components (seen at, e.g., reference numerals 418*a*-420*b*, 430-434, 446-452) may be connected to one another contained within the housing 424. The faceplate 412 may be secured to a front end of the housing 424 (e.g., in a friction-fit or adhesive connection), and the backplate 436 may be secured to a rear end of the housing 424 by the plurality of screws 442.

Figure 25:
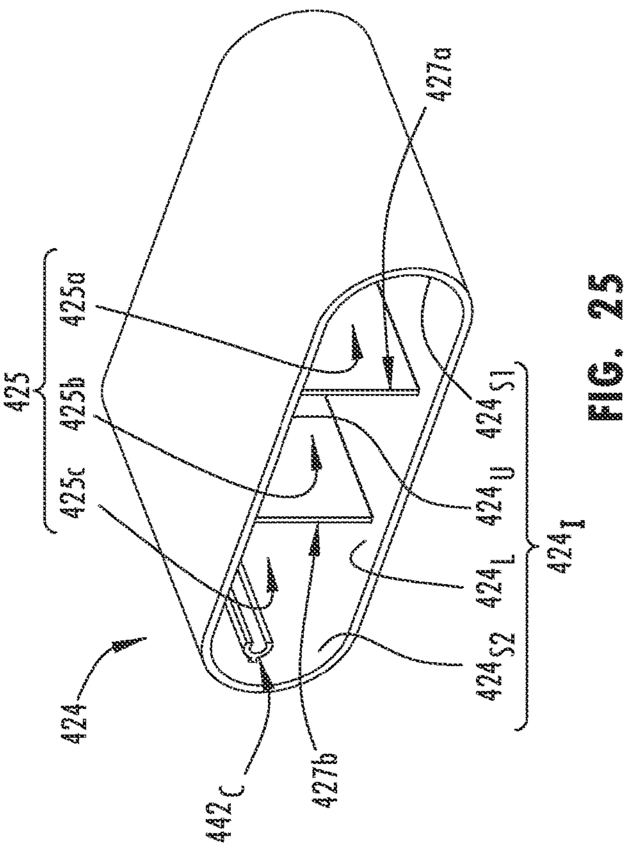
FIG. 25 is a perspective view of a housing of the power receptacle assembly of FIG. 24.
Figure 27:
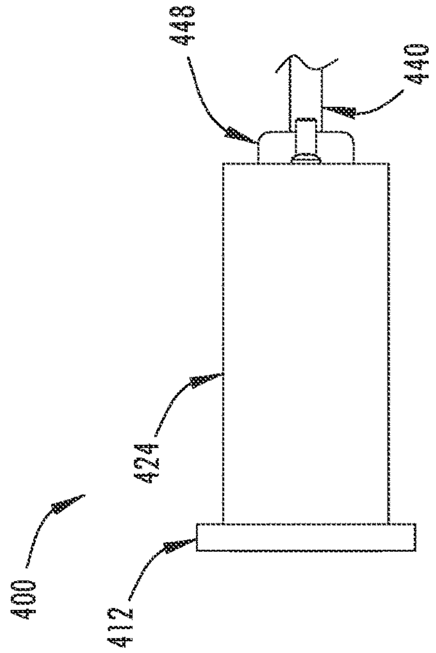
FIG. 27 is a side view of the power receptacle assembly of FIG. 24.
Figure 26:
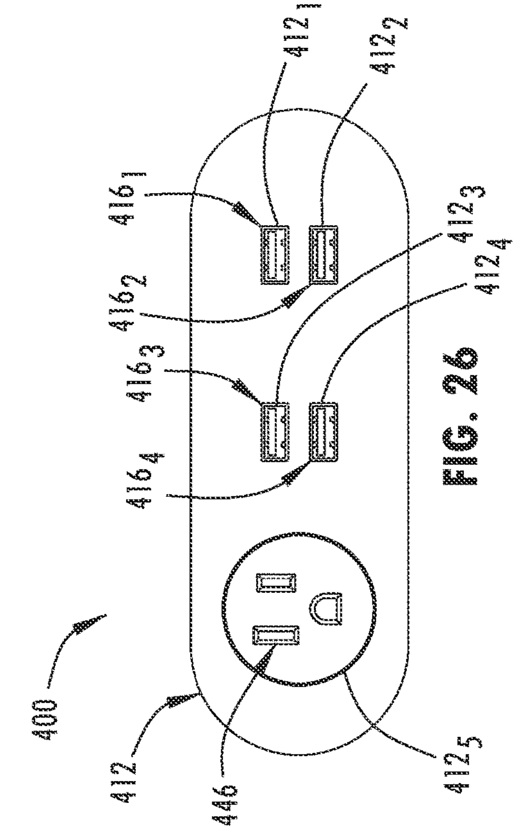
FIG. 26 is a front view of the power receptacle assembly of FIG. 24.

As seen at FIG. 25, the housing 424 may include an inner surface 4241 that defines an interior cavity 425 of the housing 424. Furthermore, the housing 424 may include a first interior wall 427*a* and a second interior wall 427*b* that subdivides the interior cavity 425 into: (1) a first sub-cavity 425*a* that is sized for containing the first low voltage power supply circuit subassembly 416*a*; (2) a second sub-cavity 425*b* that is sized for containing the second low voltage power supply circuit subassembly 416*b*; and (3) a third sub-cavity 425*c* that is sized for containing the AC receptacle with wire leads 446.

The inner surface 4241 of the housing 424 may be formed by, for example, a lower inner surface 424L, an upper inner surface 424U, a first inner side surface 424S1, and a second inner side surface 424S2. Each of the first inner side surface 424S1 and the second inner side surface 424S2 may include, for example, one or more screw-receiving channels 442C that are sized for receiving the plurality of screws 442 for the purpose of removably-securing the backplate 436 to the rear end of the housing 424. The remaining surface portions defining the inner surface 4241 of the housing 424 do not include surface interruptions such as, for example, longitudinal or elongate: slots; grooves; channels; protrusions; or the like that may be otherwise sized for slidably-receiving, for example, any portion of the first low voltage power supply circuit subassembly 416*a* or the second low voltage power supply circuit subassembly 416*b* such as, for example, a base plate (see, e.g., base plate 416BP) of either of: (1) the first low voltage power supply circuit subassembly 416*a* within, for example, the first sub-cavity 425*a*; or (2) the second low voltage power supply circuit subassembly 416*b* within, for example, the second sub-cavity 425*b*.

With reference to FIG. 24, in some configurations, each of the first low voltage power supply cradle 418*a* and the second low voltage power supply cradle 418*b* may be configured include one or more protrusions (see, e.g., one or more snap-fit barbs 418B and one or more ribs 418R) that retain and support the base plate 416BP of each of, respectively, the first low voltage power supply circuit subassembly 416*a* and the second low voltage power supply circuit subassembly 416*b* for forming, respectively, a first low voltage device assembly 417*a* and a second low voltage device assembly 417*b* (that are each substantially similar in structure, function, use, and assembly thereof with respect to the housing 224 as described above at FIGS. 10A-15 with respect to the low voltage device assembly 217 and the housing 224). The one or more protrusions 418B, 418R may, in some configurations, not be elongate (i.e., the one or more protrusions 418B, 418R do not extend along a length of either of the first or second low voltage power supply cradles 418*a*, 418*b* between approximately, for example, a proximal end of either of the low voltage power supply cradles 418*a*, 418*b* and a distal end of either of the low voltage power supply cradles 418*a*, 418*b*. Accordingly, for example: (1) the first low voltage device assembly 417*a* may be interfaced with the first sub-cavity 425*a* of the cavity 425 of the housing 424 in a substantially similar manner as described above with respect to how the low voltage device assembly 217 is interfaced with the first sub-cavity 225*a* of the cavity 225 of the housing 224; and (2) the second low voltage device assembly 417*b* may be interfaced with the second sub-cavity 425*b* of the cavity 425 of the housing 424 in a substantially similar manner as described above with respect to how the low voltage device assembly 217 is interfaced with the first sub-cavity 225*a* of the cavity 225 of the housing 224.

Figure 28:
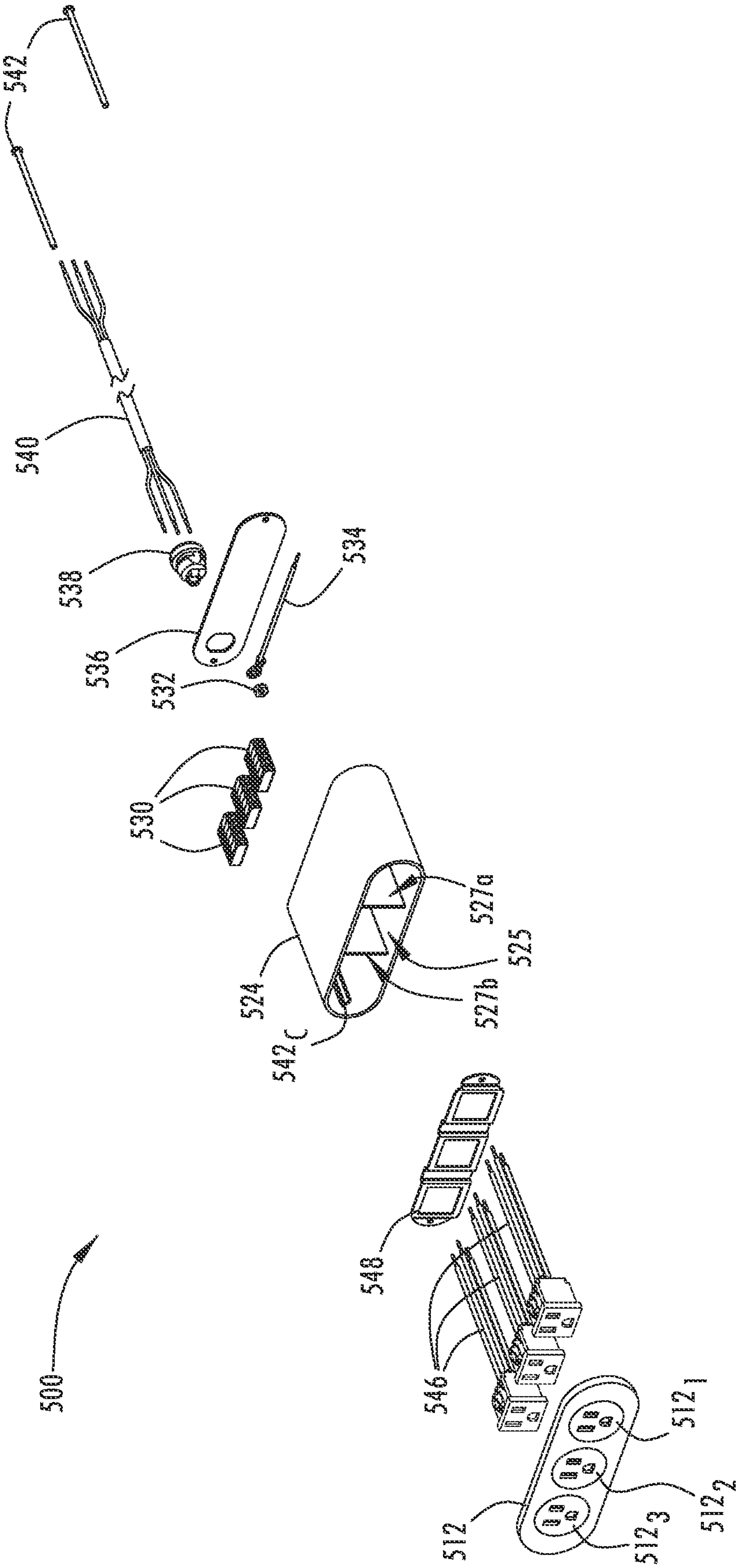
FIG. 28 is an exploded perspective view of an exemplary power receptacle assembly.

An exemplary power receptacle assembly is shown generally at 500 at FIGS. 28-31. As seen at FIG. 28, in some configurations, the power receptacle assembly 500 may include: a faceplate 512; a housing 524; a plurality of five port wire splicing connectors 530; a nut 532; a wire jumper 534; a backplate 536; a power cord strain relief port 538; a power cord (including a removal of jacket (ROJ) at a first end and a ROJ or an AC plug at a second end) 540; a plurality of screws 542; a plurality of AC receptacles with wire leads 546; and a plurality of AC plate enclosures 548.

The faceplate 512 forms a plurality of openings including, for example, a first opening 5121, a second opening 5122, and a third opening 5123. Unlike the power receptacle assemblies 10, 100, 200, 300, 400 described above, the power receptacle assembly 500 does not include a low voltage power supply circuit subassembly or a low voltage power supply cradle. Rather, the power receptacle assembly 500 includes, for example, three power outlets formed by the plurality of AC receptacles with wire leads 546. As seen at FIG. 28, each AC receptacle with wire leads 546 may receive power from the power cord 540.

When the power receptacle assembly 500 is assembled, the faceplate 512 is sized such that the first opening 5121, the second opening 5122, and the third opening 5123 reveal, respectively, a first, a second, and a third AC receptacle with wire leads of the plurality of AC receptacles with wire leads 546 that are contained within and enclosed by the housing 524. Although the power receptacle assembly 500 that does not include a low voltage power supply circuit subassembly, the first, second, and third AC receptacles with wire leads 546 may be sized to allow for compact design that is configured for placement in various locations in which packaging space is limited in, for example, an area where a plurality of power receptacles (e.g., the power output receptacles 546) are desired.

With reference to FIGS. 28-31, the faceplate 512 may be secured to a front end of the housing 524 (e.g., in a friction-fit or adhesive connection). The backplate 536 may be secured to a rear end of the housing 524 by the plurality of screws 442.

Figure 29:
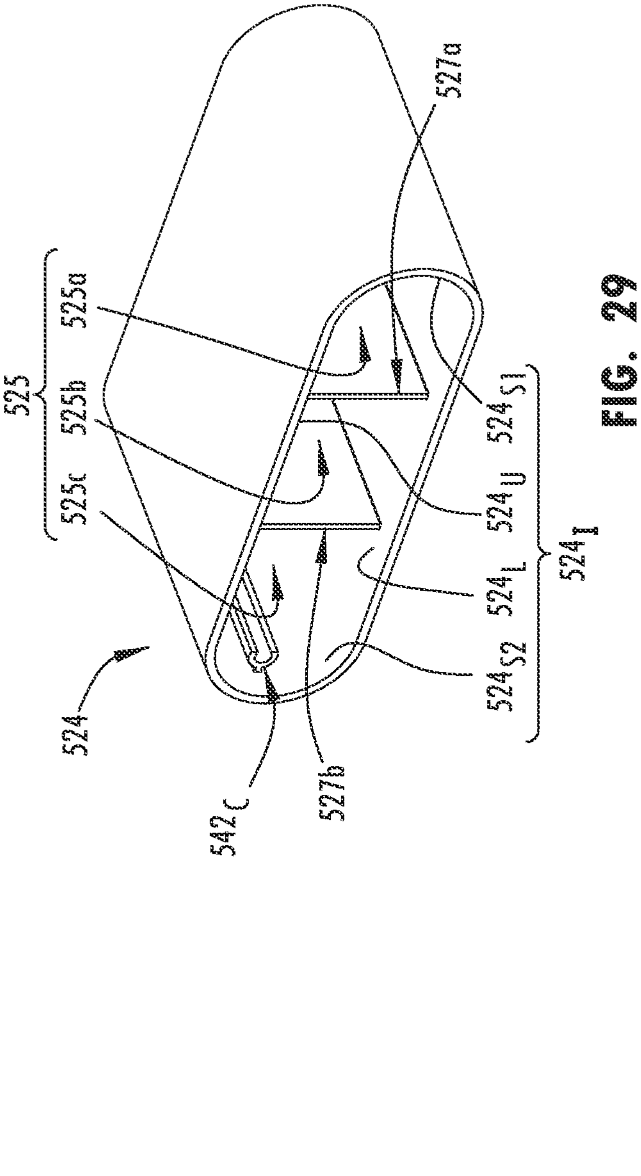
FIG. 29 is a perspective view of a housing of the power receptacle assembly of FIG. 28.
Figure 31:
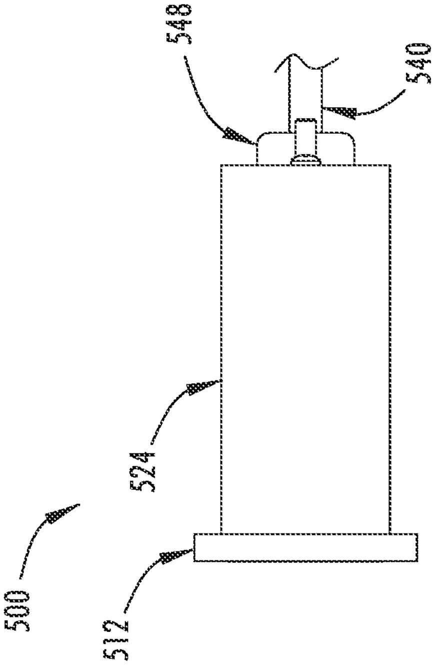
FIG. 31 is a side view of the power receptacle assembly of FIG. 28.
Figure 30:
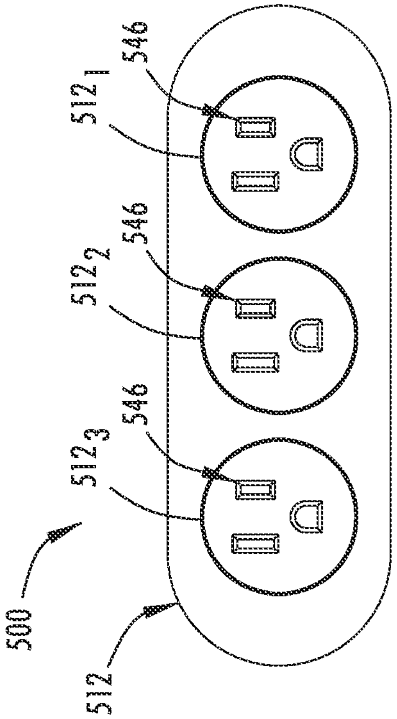
FIG. 30 is a front view of the power receptacle assembly of FIG. 28.

As seen at FIG. 29, the housing 524 may include an inner surface 524I that defines an interior cavity 525 of the housing 524. Furthermore, the housing 524 may include a first interior wall 527*a* and a second interior wall 527*b* that subdivides the interior cavity 525 into: (1) a first sub-cavity 525*a* that is sized for containing the first AC receptacle with wire leads 546; (2) a second sub-cavity 525*b* that is sized for containing the second AC receptacle with wire leads 546; and (3) a third sub-cavity 525*c* that is sized for containing the third AC receptacle with wire leads 546.

The inner surface 524I of the housing 524 may be formed by, for example, a lower inner surface 524L, an upper inner surface 524U, a first inner side surface 524S1, and a second inner side surface 524S2. Each of the first inner side surface 524S1 and the second inner side surface 524S2 may include, for example, one or more screw-receiving channels 542C that are sized for receiving the plurality of screws 542 for the purpose of removably-securing the backplate 536 to the rear end of the housing 524. The remaining surface portions defining the inner surface 524I of the housing 524 do not include surface interruptions such as, for example, longitudinal or elongate: slots; grooves; channels; protrusions; or the like that may be otherwise sized for slidably-receiving, for example, any portion of the first, second, and third AC receptacles with wire leads 546. Accordingly, even though the power receptacle assembly 500 does not include a low voltage power supply circuit subassembly or a low voltage power supply cradle, as comparatively seen at FIGS. 1-4, 5-8, 9-19, 20-23, and 24-27, the respective housings 24, 124, 224, 324, 424 of the respective power receptacle assemblies 10, 100, 200, 300, 400 may be substantially similar in that, for example, the respective housings 24, 124, 224, 324, 424 may accommodate, for example, any combination of any number (including zero) of: (1) the low voltage power supply circuit subassembly 16, 116, 216, 316, 416*a*, 416*b*; the low voltage power supply cradle 18, 118, 218, 318, 418*a*, 418*b*; and the AC receptacle with wire leads 146, 246, 346, 446.

The articles “a,” “an,” and “the” are intended to mean that there are one or more of the elements in the preceding descriptions. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A power receptacle assembly comprising:

a power supply cradle including:

a base member;

a first sidewall extending from the base member; and a second sidewall extending from the base member, wherein one or a combination of the base member, the first sidewall and the second sidewall is configured to include one or more protrusions;

a circuit subassembly including:

a base plate; and at least one low voltage power output receptacle electrically connected to the base plate, wherein the base plate is secured to the power supply cradle by the one or more protrusions; and a housing that includes an inner surface forming at least one elongated cavity, wherein, with the base plate secured to the power supply cradle, the power supply cradle is arranged within the at least one cavity of the housing with at least one of the first sidewall, the second sidewall, or the base member spanning laterally across the elongated cavity and contacting opposing portions of the inner surface to prevent movement of the power supply cradle within the cavity, such that base plate of the low voltage power supply circuit subassembly does not directly contact any of the inner surface that forms the at least one cavity of the housing.

2. The power receptacle assembly of claim 1, wherein the one or more protrusions is not elongate.

3. The power receptacle assembly of claim 1, wherein the one or more protrusions include one or more of: one or more snap-fit barbs and one or more ribs.

4. The power receptacle assembly of claim 3, wherein the one or more snap-fit barbs or the one or more ribs extend from one or both of the base member and a first sidewall near a proximal end of the power supply cradle.

5. The power receptacle assembly of claim 3, wherein the one or more snap-fit barbs or the one or more ribs extend from one or both of the base member and a second sidewall near a proximal end of the power supply cradle.

6. The power receptacle assembly of claim 3, wherein the one or more snap-fit barbs or the one or more ribs extend from one or both of the base member and a first sidewall near a distal end of the power supply cradle.

7. The power receptacle assembly of claim 3, wherein the one or more snap-fit barbs or the one or more ribs extend from one or both of the base member and a second sidewall near a distal end of the power supply cradle.

8. The power receptacle assembly of claim 3, wherein the one or more snap-fit barbs or the one or more ribs extend from a region of the base member near a distal end of the power supply cradle between a first sidewall of the power supply cradle and a second sidewall of the power supply cradle.

9. A power receptacle assembly comprising:

a housing that includes an inner surface forming at least one elongated cavity; and a power supply cradle comprising:

a base member;

a first side member extending from the base member; and a second side member extending from the base member, wherein one or a combination of the base member, the first side member, and the second side member is configured to include one or more protrusions configured to engage a power supply circuit board in a secure manner, wherein, with the power supply circuit board secured to the power supply cradle, the power supply cradle is arranged within the at least one elongated cavity of the housing with at least one of the first sidewall, the second sidewall, or the base member spanning laterally across the elongated cavity and contacting opposing portions of the inner surface to prevent movement of the power supply cradle within the cavity.

10. The power receptacle assembly of claim 9, wherein the one or more protrusions is not elongate.

11. The power receptacle assembly of claim 9, wherein the one or more protrusions include one or more of: one or more snap-fit barbs;

and one or more ribs.

12. The power receptacle assembly of claim 11, wherein the one or more snap-fit barbs or the one or more ribs extend from one or both of the base member and the first side member near a proximal end of the low voltage power supply cradle.

13. The power receptacle assembly of claim 11, wherein the one or more snap-fit barbs or the one or more ribs extend from one or both of the base member and the second side member near a proximal end of the low voltage power supply cradle.

14. The power receptacle assembly of claim 11, wherein the one or more snap-fit barbs or the one or more ribs extend from one or both of the base member and the first side member near a distal end of the low voltage power supply cradle.

15. The power receptacle assembly of claim 11, wherein the one or more snap-fit barbs or the one or more ribs extend from one or both of the base member and the second side member near a distal end of the low voltage power supply cradle.

16. The power receptacle assembly of claim 11, wherein the one or more snap-fit barbs or the one or more ribs extend from a region of the base member near a distal end of the low voltage power supply cradle between the first side member of the low voltage power supply cradle and the second side member of the low voltage power supply cradle.

17. A low voltage power receptacle assembly comprising:

a power supply cradle including:

a base member;

a first sidewall extending from the base member; and a second sidewall extending from the base member, wherein one or a combination of the base member, the first sidewall, and the second sidewall is configured to include one or more protrusions;

a receptacle circuit subassembly including:

a base plate; and at least one low voltage power output electrically connected to the base plate and supported thereat, wherein the base plate is secured to the power supply cradle by the one or more protrusions for forming a low voltage receptacle subassembly; and a housing that includes an inner surface forming at least one cavity, wherein the low voltage receptacle subassembly is arranged within the at least one cavity of the housing such that base plate of the receptacle circuit subassembly does not directly contact any of the inner surface that forms the at least one cavity of the housing, and wherein the low voltage receptacle subassembly is arranged within the at least one cavity of the housing with at least one of the first sidewall, the second sidewall, or the base member spans laterally across the at least one cavity and contacts opposing portions of the inner surface to prevent movement of the power supply cradle within the cavity.

* * * * *